(12) United States Patent
Sheppard et al.

(10) Patent No.: US 11,973,576 B2
(45) Date of Patent: Apr. 30, 2024

(54) METHODS, SYSTEMS AND APPARATUS TO DETERMINE PANEL ATTRITION

(71) Applicant: The Nielsen Company (US), LLC, New York, NY (US)

(72) Inventors: Michael Sheppard, Holland, MI (US); Christie Nicole Summers, Baltimore, MD (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/952,054

(22) Filed: Sep. 23, 2022

(65) Prior Publication Data

US 2023/0208540 A1    Jun. 29, 2023

Related U.S. Application Data

(60) Provisional application No. 63/294,768, filed on Dec. 29, 2021.

(51) Int. Cl.
*H04H 60/33* (2008.01)
*H04N 21/462* (2011.01)
*H04N 21/466* (2011.01)

(52) U.S. Cl.
CPC ........ *H04H 60/33* (2013.01); *H04N 21/4622* (2013.01); *H04N 21/4667* (2013.01)

(58) Field of Classification Search
CPC . H04H 60/33; H04N 21/4622; H04N 21/4667
See application file for complete search history.

(56) References Cited

U.S. PATENT DOCUMENTS

| | | | | |
|---|---|---|---|---|
| 8,165,386 B1* | 4/2012 | Moon | ............... | G06V 10/94 706/15 |
| 8,768,770 B2* | 7/2014 | Kitts | ............... | G06Q 30/0254 705/14.66 |
| 2008/0147497 A1* | 6/2008 | Tischer | ............... | G06Q 30/0275 705/14.71 |
| 2016/0150280 A1* | 5/2016 | Cui | ............... | G06Q 30/0201 725/14 |
| 2018/0035142 A1* | 2/2018 | Rao | ............... | H04N 21/4667 |
| 2018/0165554 A1* | 6/2018 | Zhang | ............... | G06F 18/2411 |
| 2018/0253743 A1* | 9/2018 | Li | ............... | G06N 3/08 |
| 2019/0034766 A1* | 1/2019 | Chen | ............... | G06V 10/82 |
| 2019/0294874 A1* | 9/2019 | Orlov | ............... | G06N 3/084 |
| 2020/0258171 A1* | 8/2020 | Gibbon | ............... | G06F 16/9535 |

* cited by examiner

*Primary Examiner* — Nathan J Flynn
*Assistant Examiner* — Christine A Kurien

(57) ABSTRACT

Methods, apparatus, and systems are disclosed for estimating panel attrition. An example apparatus includes at least one memory, machine readable instructions, and processor circuitry to execute the machine readable instructions to determine a beta distribution of a non-parametric survival curve estimate based on panel meter data associated with a cohort of panelists, determine confidence intervals for a set of beta distribution parameters associated with the survival curve estimate, and output a panelist attrition estimate generated based on the confidence intervals for the survival curve estimate, the panelist attrition estimate to represent panelist retention over time based on an installation date of the panel meter.

20 Claims, 13 Drawing Sheets

METHODS, SYSTEMS AND APPARATUS TO DETERMINE PANEL ATTRITION

RELATED APPLICATIONS

This patent claims the benefit of U.S. Patent Application No. 63/294,768, filed on Dec. 29, 2021. U.S. Patent Application No. 63/294,768 is hereby incorporated herein by reference in its entirety. Priority to U.S. Patent Application No. 63/294,768 is claimed.

FIELD OF THE DISCLOSURE

This disclosure relates generally to computer-based audience monitoring, and, more particularly, to methods, systems, and apparatus to determine panel attrition.

BACKGROUND

Media is accessible to users through a variety of platforms. For example, media can be viewed on television sets, via the Internet, on mobile devices, in-home or out-of-home, live or time-shifted, etc. Understanding consumer-based engagement with media within and across a variety of platforms (e.g., television, online, mobile, and emerging) allows media providers and website developers to increase user engagement with their media.

BRIEF DESCRIPTION OF THE DRAWINGS

The figures are not to scale. In general, the same reference numbers will be used throughout the drawing(s) and accompanying written description to refer to the same or like parts.

Figure 1:
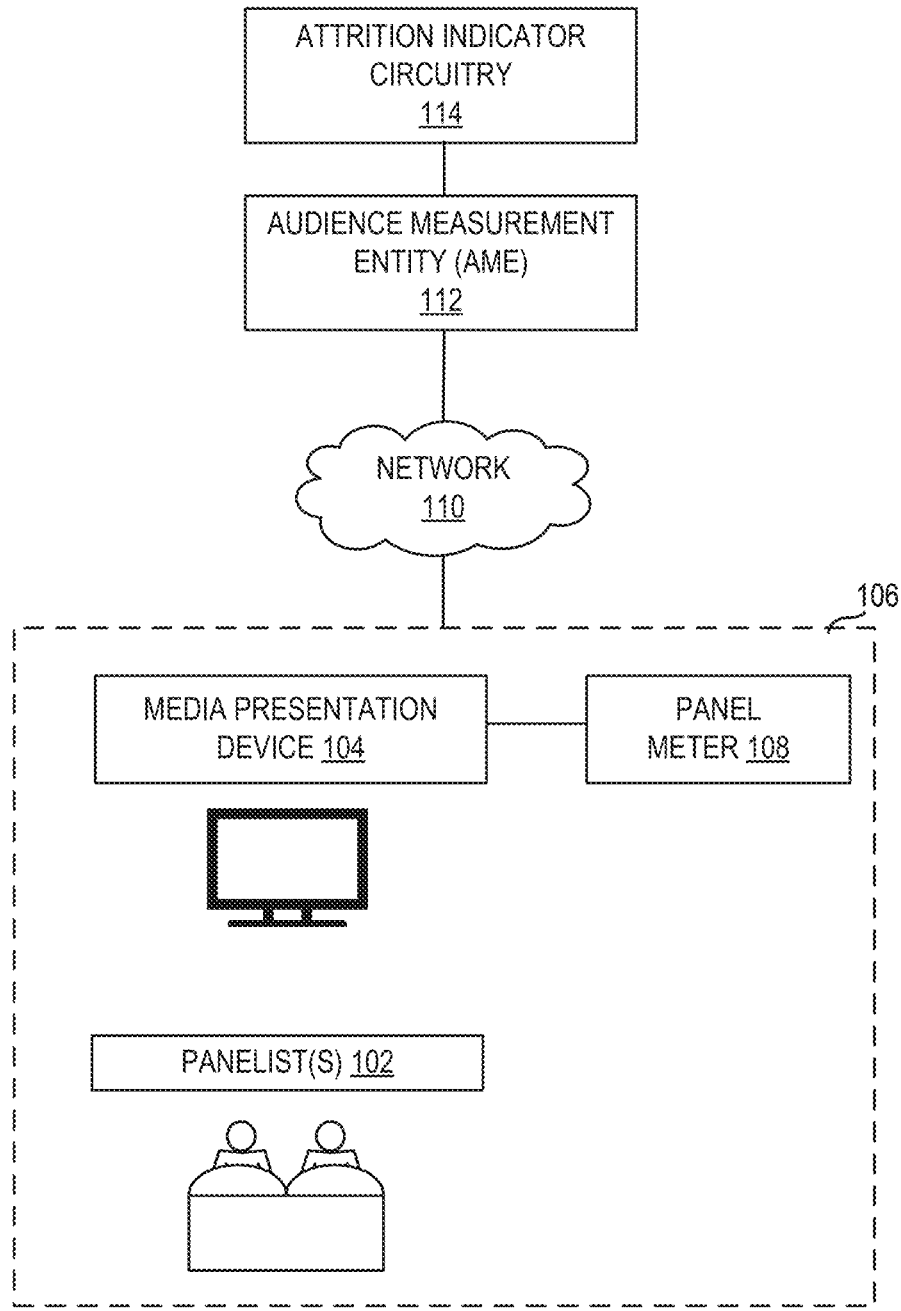
FIG. 1 is an example environment including attrition indicator circuitry to monitor panel meter usage.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities (AMEs) perform measurements to determine the number of people (e.g., an audience) who engage in viewing television, listening to radio stations, browsing websites, etc., all of which are examples of media. Given that companies and/or individuals producing media (e.g., content and/or advertisements) want to understand the reach and effectiveness of their content, it is useful to identify such information. To achieve this, companies such as The Nielsen Company, LLC (US), LLC utilize on-device meters (ODMs) to monitor usage of cellphones, tablets (e.g., iPads™) and/or other computing devices (e.g., PDAs, laptop computers, etc.) of individuals who volunteer to be part of a panel (e.g., panelists). Panelists are users who have provided demographic information at the time of registration into a panel, allowing their demographic information to be linked to the media they choose to listen to or view. As a result, the panelists (e.g., the audience) represent a statistically significant sample of the large population (e.g., the census) of media consumers, allowing broadcasting companies and advertisers to better understand who is utilizing their media and maximize revenue potential.

An on-device meter (ODM) can be implemented by software that collects data of interest concerning usage of the monitored device. The ODM can collect data indicating media access activities (e.g., website names, dates/times of access, page views, duration of access, clickstream data and/or other media identifying information (e.g., webpage content, advertisements, etc.)) to which a panelist is exposed. This data is uploaded, periodically or aperiodically, to a data collection facility (e.g., the audience measurement entity server). Given that a panelist submits their demographic data when registering with an AME, ODM data is advantageous in that it links this demographic information and the activity data collected by the ODM. Such monitoring activities are performed by tagging Internet media to be tracked with monitoring instructions, such as based on examples disclosed in Blumenau, U.S. Pat. No. 6,108,637, which is hereby incorporated herein by reference in its entirety. Monitoring instructions form a media impression request that prompts monitoring data to be sent from the ODM client to a monitoring entity (e.g., an AME such as The Nielsen Company, LLC) for purposes of compiling accurate usage statistics. Impression requests are executed whenever a user accesses media (e.g., from a server, from a cache). When a media user is also a part of the AME's panel (e.g., a panelist), the AME is able to match panelist demographics (e.g., age, occupation, etc.) to the panelist's media usage data (e.g., user-based impression counts, user-based total impression durations). As used herein, an impression is defined to be an event in which a home or individual accesses and/or is exposed to media (e.g., an advertisement, content in the form of a page view or a video view, a group of advertisements and/or a collection of content, etc.).

While panelist data provides information about media access activities, confirming panel meter activity and panelist engagement can be necessary to ensure accurate data collection. For example, panelists can install a panel meter but fail to actively participate in the panel (e.g., send activity logs). Likewise, panelists who were once active can become inactive over time (e.g., cease to provide activity logs). As such, assessment of panel attrition over time is important to determine panelist status (e.g., active, inactive, attriter, etc.). In some examples, panelists can be assessed in cohorts to determine a period of time between panel meter installation and panelist attrition (e.g., as determined by panel meter uninstallation and/or ceased logging activity).

Example systems, methods, apparatus, and articles of manufacture disclosed herein determine panel attrition. In examples disclosed herein, panel attrition can be assessed based on an approximate distribution of a non-parametric estimate of a survival function. In examples disclosed herein, a Haldane's prior distribution can be used within a beta distribution. Some examples disclosed herein treat a Kaplan-Meier product estimate (e.g., a non-parametric estimate of a survival curve that can include censoring) as a product of independent beta distributions instead of as a product of point estimates. As described in connection with examples disclosed herein, a non-parametric estimate of the survival function and corresponding variance and confidence interval determination can be used to identify panelists who remain active after panel meter installation versus panelists who become inactive and/or can be classified as attriters (e.g., based on inactivity over a defined period of time). Furthermore, examples disclosed herein permit estimation of anticipated panel attrition levels over a given period of time, based on available panel activity data. Such panelist attrition assessment contributes to improved analyses associated with panel data collection.

Although examples disclosed herein are discussed in connection with panel-based data, disclosed examples apply to audience-based measurement more generally. Thus, although examples disclosed herein refer to, for instance, panelists associated with media exposure, examples disclosed herein more generally apply to audience measurement activities and/or any other types of panel-based assessments.

FIG. 1 is an example environment 100 to monitor panel meter usage. The environment 100 includes example panelist(s) 102, an example media presentation device 104, an example panel meter 108, an example network 110, an example audience measurement entity (AME) 112, and example attrition indicator circuitry 114.

The panelist(s) 102 can include individuals who volunteer to be part of a panel. Panelists 102 are users who have provided demographic information at the time of registration into a panel, allowing their demographic information to be linked to the media they choose to listen to or view. In some examples, the panelist(s) 102 provide information about media access activities. For example, panelists can install the panel meter 108 to actively participate in the panel (e.g., send activity logs).

The media presentation device 104 can include any type of media presentation device and/or electronic user device (e.g., a personal computer). In operation, the media presentation device 104 presents media such as television shows, movies, commercials, etc. In the example of FIG. 1, the media presentation device 104 can be in communication with the panel meter 108 to determine panelist exposure to specific media. In the example of FIG. 1, the media presentation device 104 is located in an example media presentation environment 106 that includes panelist(s) 102 and the panel meter 108. For example, the media presentation environment 106 can correspond to a panelist home and/or specific room of the panelist home that houses the media presentation device 104 and the corresponding installed panel meter 108.

The panel meter 108 can be implemented by software that collects data of interest concerning usage of the monitored device (e.g., media presentation device 104). The panel meter 108 can collect data indicating media access activities (e.g., website names, dates/times of access, page views, duration of access, clickstream data and/or other media identifying information (e.g., webpage content, advertisements, etc.)) to which the panelist(s) 102 are exposed. This data is uploaded, periodically or aperiodically, to a data collection facility (e.g., the audience measurement entity server). In some examples, the panel meter 108 can include a portable people meter (PPMs) and/or a stationary metering device (e.g., such as Global Television Audience Metering (GTAM) meters, active/passive (A/P) meters, Nano meters, etc.) provided to AME panelist(s) 102. In some examples, the panel meter 108 can include a memory, a microphone, a wireless transceiver, and/or a power supply (e.g., rechargeable batteries).

The network 110 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The AME 112 operates as an independent party to measure and/or verify audience measurement information relating to media accessed by panelists. When media is accessed using the media presentation device 104, the AME 112 stores information relating to user viewership and/or media exposure (e.g., length of time that a panelist viewed a television program, etc.). In some examples, the AME 112 receives demographic information from the enrolling people (e.g., panelist(s) 102) so that subsequent correlations may be made between advertisement/media exposure to those panelists and different demographic markets, allowing the panelist(s) 102 to represent a statistically significant sample of the large population of media consumers.

The attrition indicator circuitry 114 determines panel attrition based on data received from the panel meter 108 and/or the AME 112. For example, the attrition indicator circuitry 114 determines panelist(s) 102 status (e.g., active, inactive, or attriter) based on panel meter 108 data indicative of whether the panelist(s) 102 use the panel meter (e.g., send activity logs via the network 110). In some examples, the attrition indicator circuitry 114 approximates panel attrition to determine expected numbers of panelist(s) 102 that will remain active and/or inactive at a given point in time, as described in more detail in connection with FIG. 2. In particular, the attrition indicator circuitry 114 determines a non-parametric estimate of a survival curve based on a Haldane's prior distribution within a beta distribution (e.g., a non-parametric estimation is more robust and does not depend on any parametric assumptions). The attrition indicator circuitry 114 applies the non-parametric estimate of the survival function and corresponding variance and confidence interval determination to identify panelists who remain active after panel meter installation versus panelists who become inactive and/or can be classified as attriters.

In examples disclosed herein, the attrition indicator circuitry 114 can use a Kaplan-Meier survival curve to represent the probability of a panelist remaining active (e.g., surviving) for a given duration of time. Kaplan-Meier survival analysis as a method of statistically assessing survival times for observations that include censored subjects (e.g., panelists who have left the panel). For example, a Kaplan-Meier estimator represents a non-parametric estimate of the survival curve which may include censoring (e.g., an event of interest, such as panelist attrition, is not observed for some subjects before a cutoff date, such as a panelist who never leaves a panel or never becomes inactive before a cutoff date). In some examples, censored data can be used to represent data that arises when a subject's time until the event of interest is known only to occur in a certain period of time, while uncensored data occurs when the precise time until the event of interest is known. A survival function can be estimated from collected data (e.g., panel meter data) based on the Kaplan-Meier estimator. As such, the estimator can be defined as the fraction of observations surviving for a certain amount of time under the same circumstances. For example, the Kaplan-Meier estimate can be defined as shown below in accordance with Equation 1, where $d_j$ represents the number of events that took place at time ($t_j$) (e.g., time when at least one event occurred) and $n_j$ represents the number of individuals known to have survived (e.g., remained active panelists) up to time $t_j$:

$$\hat{S}(t) = \prod_{j:\ t_j \leq t} \left(1 - \frac{d_j}{n_j}\right) \qquad \text{Equation 1}$$

The survival curve can be used as a graphical representation of the probability that a panelist still has not experienced an event of interest (e.g., attrition) after surviving (e.g., being active) up to time t. The Kaplan-Meier estimate (e.g., $\hat{S}(t)$) represents a random variable and therefore has a variance. An estimate of the variance of $\hat{S}(t)$ can be represented by Greenwood's formula, as shown in connection with Equation 2:

$$\widehat{Var}(\hat{S}(t)) = \hat{S}^2(t) \sum_{j:\ t_j \leq t} \frac{d_j}{(n_j - d_j)n_j} \qquad \text{Equation 2}$$

For example, using remission data from a clinical trial in acute leukemia, where time unit j=2, the number of individuals alive just before time $t_j$ is $n_j$=21 for $t_j$=6 and $n_j$=17 for $t_j$=7, and the number of individuals dying at time $t_j$ is $d_j$=3 for $t_j$=6 and $d_j$=1 for $t_j$=7, an estimate of the survival curve can be evaluated in accordance with Equation 3 and an estimated variance can be determined in accordance with Equation 4:

$$\hat{S}(t) = \left(1 - \frac{3}{21}\right)\left(1 - \frac{1}{17}\right) = \left(\frac{18}{21}\right)\left(\frac{16}{17}\right) = 0.807 \qquad \text{Equation 3}$$

$$\widehat{Var}(\hat{S}(t)) = (0.807)^2 \left(\frac{3}{(21-3)21} + \frac{1}{(17-1)17}\right) = (0.0076) \qquad \text{Equation 4}$$

The derivation of Greenwood's formula for the estimated variance uses a point-estimate of a binomial distribution along with two applications of a delta-method and a martingale central limit theorem. For example, the Kaplan-Meier estimator is a statistic, and several estimators can be used to approximate the variance of the Kaplan-Meier estimator. Greenwood's formula can alternatively be expressed as follows in connection with Equation 5, where $d_i$ is the number of cases and $n_i$ is the total number of observations for $t_i < t$:

$$\widehat{Var}(\hat{S}(t)) = \hat{S}^2(t) \sum_{i:\ t_i \leq t} \frac{d_i}{(n_i - d_i)n_i} \qquad \text{Equation 5}$$

For example, Greenwood's formula is derived by noting that the probability of obtaining $d_i$ failures out of $n_i$ cases follows a binomial distribution with a failure probability of $h_i$. As a result, for a maximum likelihood hazard rate ($\hat{h}_i = d_i/n_i$), which corresponds to the rate of death for an item of a given age (e.g., used as part of a hazard function to determine the chances of survival for a certain time), the expected value can be defined as $E(\hat{h}_i)=h_i$ and variance can be defined as $\text{Var}(\hat{h}_i)=h_i(1-h_i)/n_i$. To avoid using multiplicative probabilities, the variance of the logarithm of $\hat{S}(t)$ can be computed and a delta method (e.g., general method for deriving the variance of a function of asymptotically normal random variables with known variance) can be used to convert the variance of the logarithm of $\hat{S}(t)$ (e.g., Var (log $\hat{S}(t)$)) to the original variance (e.g., Var ($\hat{S}(t)$)), as shown below:

$$\text{Var}(\log \hat{S}(t)) \sim \frac{1}{\hat{S}(t)^2} \text{Var}(\hat{S}(t)) \rightarrow \text{Var}(\hat{S}(t)) \sim \hat{S}(t)^2 \text{Var}(\log \hat{S}(t))$$

Using a martingale central limit theorem (e.g., which is based on a central limit theorem stating that the sum of many independent identically-distributed random variables can converge in distribution to a standard normal distribution), the variance of the sum can be shown to be equal to the sum of variance in accordance with Equation 6:

$$\log \hat{S}(t) = \Sigma_{i: t_i \leq t} \log(1-\hat{h}_i) \qquad \text{Equation 6}$$

As such, the resulting variance (e.g., Var ($\hat{S}(t)$)) can be written as shown below:

$$\text{Var}(\hat{S}(t)) \sim \hat{S}(t)^2 \text{Var}(\Sigma_{i: t_i \geq t} \log(1-\hat{h}_i)) \sim \hat{S}(t)^2 \Sigma_{i: t_i \leq t} \text{Var}(\log(1-\hat{h}_i))$$

Using the delta method, the variance can further be rewritten in accordance with Equations 6-9 below:

$$\text{Var}(\hat{S}(t)) \sim \hat{S}(t)^2 \sum_{i: t_i \leq t} \left(\frac{\partial \log(1-\hat{h}_i)}{\partial \hat{h}_i}\right)^2 \text{Var}(\hat{h}_i) = \qquad \text{Equation 7}$$

$$\hat{S}(t)^2 \sum_{i: t_i \leq t} \left(\frac{1}{1-\hat{h}_i}\right)^2 \frac{\hat{h}_i(1-\hat{h}_i)}{n_i}$$

$$= \hat{S}(t)^2 \sum_{i: t_i \leq t} \frac{\hat{h}_i}{n_i(1-\hat{h}_i)} \qquad \text{Equation 8}$$

$$= \hat{S}(t)^2 \sum_{i: t_i \leq t} \frac{d_i}{n_i(n_i-d_i)} \qquad \text{Equation 9}$$

When censoring is not present, for time interval $t_k \leq t \leq t_{k+1}$, the relationship $r_{j+1}=r_j-d_j$ represents those at risk at time $t_{j+1}$, which is equal to those at risk at time $t_j$ minus those who died in that time interval. For example, the second expression of Greenwood's formula can be considered first, as shown in connection with Equations 10-15:

$$\sum_{j: t_j \leq t} \frac{d_j}{r_j(r_j-d_j)} = \sum_{j: t_j \leq t} \frac{r_j - r_{j+1}}{r_j(r_{j+1})} \qquad \text{Equation 10}$$

$$= \sum_{j: t_j \leq t} \frac{1}{r_{j+1}} - \frac{1}{r-j} \qquad \text{Equation 11}$$

$$= \frac{1}{r_{k+1}} - \frac{1}{r_1} \qquad \text{Equation 12}$$

$$= \frac{r_1 - r_{k+1}}{r_1 r_{k+1}} \qquad \text{Equation 13}$$

$$= \frac{1-\frac{r_{k+1}}{r_1}}{r_1\left(\frac{r_{k+1}}{r_1}\right)} \qquad \text{Equation 14}$$

$$= \frac{1-S(t)}{r_1 S(t)} \qquad \text{Equation 15}$$

When censoring is not present, the variance of S(t) can be determined using Equations 16-18 based on the substitution of Equation 15:

$$\text{Var}(S(t)) = S^2(t) \sum_{j: t_j \leq t} \frac{d_j}{(r_j-d_j)r_j} \qquad \text{Equation 16}$$

$$= S^2(t)\left(\frac{1-S(t)}{r_1 S(t)}\right) \qquad \text{Equation 17}$$

$$= \frac{S(t)(1-S(t))}{r_1} \qquad \text{Equation 18}$$

As previously mentioned, in the absence of censoring, $r_{j+1}=r_j-d_j$ can be used to represent those at risk at time $t_{j+1}$ (e.g., given that Greenwood's formula identifies a standard error on the Kaplan-Meier estimator, and the Kaplan-Meier estimator is frequently used for survival curve analysis as it relates to, for example, patient survival, where patient death is the primary event of interest). This assumption is shown in the example of Equations 19-21 below, where $d_j=r_{j+1}$ (e.g., those that died ($d_j$) in the interval are those that are alive at the beginning ($r_j$) minus those that are alive at the end ($r_{j+1}$)). For example, survival curve ($S^+(t)$) can be represented as follows:

$$S^+(t) = \prod_{j: t_j \leq t}\left(1 - \frac{d_j}{1+r_j}\right) \qquad \text{Equation 19}$$

$$= \prod_{j: t_j \leq t}\left(\frac{r_j+1-d_j}{1+r_j}\right) \qquad \text{Equation 20}$$

$$= \prod_{j: t_j \leq t}\left(\frac{1+r_{j+1}}{1+r_j}\right) = \frac{1+r_{k+1}}{1+r_1} = \frac{1+r_1 S(t)}{1+r_1} \qquad \text{Equation 21}$$

As such, the substitution for a case not involving censoring yields the following variance equation, as shown on connection with Equations 22-24:

$$\text{Var}(S(t)) = S(t)(S^+(t) - S(t)) \qquad \text{Equation 22}$$

$$= S(t)\left(\frac{1+r_1 S(t)}{1+r_1} - S(t)\right) \qquad \text{Equation 23}$$

$$= \frac{S(t)(1-S(t))}{1+r_1} \qquad \text{Equation 24}$$

In most derivations of the Kaplan-Meier estimate, along with Greenwood's formula as shown above, the proportion of $d_j$ events out of $n_j$ within the jth time interval can be estimated using a binomial distribution with a point estimate of the parameter p identified as $$\hat{p} = \frac{d_j}{n_j}.$$

Alternatively, a simple Bayesian approach can be implemented. For example, assuming the prior distribution of p follows a beta distribution with parameters $(\alpha, \beta)$, then the posterior distribution of p after observing $d_j$ events out of $n_j$ will have a distribution (Z) that can be approximated with a beta distribution as follows, where the expected value (E(Z)) can be defined in accordance with Equation 25:

$$Z \sim \text{Beta}(\alpha + d_j, \beta + (n_j - d_j)) \quad \text{Equation 25}$$

$$E(Z) = \frac{\alpha + d}{\alpha + \beta + n}$$

One property of the beta distribution is that if the distribution $Z \sim \text{Beta}(a, b)$, then $1-Z \sim \text{Beta}(b, a)$. Furthermore, the factor contributed at time $t_{(j)}$ to the Kaplan-Meier estimator has a functional representation of $$1 - \frac{d_j}{n_j},$$

thereby yielding the following relationship and resulting expected value equation, as shown in connection with Equation 26:

$$1 - Z \sim \text{Beta}(\beta + (n_j - d_j), \, \alpha + d_j) \quad \text{Equation 26}$$

$$E(1 - Z) = \frac{\beta - d_j + n_j}{\alpha + \beta + n_j}$$

In order to identify the expected value (E), a prior distribution can be selected. For example, a prior distribution represents the information about an uncertain parameter that is combined with the probability distribution of new data to yield a posterior distribution, which can be used for subsequent inferences and decisions involving the uncertain parameter. There are a number of prior distributions, including a Bayesian prior distribution (e.g., Beta(1,1)), a Haldane's prior distribution (e.g., Beta(0,0)), and a Jeffreys' prior distribution (e.g., Beta(1/2,1/2). Given that all of these prior distributions include $\alpha=\beta=c$, the expected value can be simplified as follows in accordance with Equation 27:

$$1 - Z \sim \text{Beta}(c + (n_j - d_j), \, c + d_j) \quad \text{Equation 27}$$

$$E(1 - Z) = \frac{c - d_j + n_j}{2c + n_j}$$

However, there are three main reasons for choosing the Haldane's prior distribution ($\alpha=\beta=0$) over the other listed prior distributions. For example, as the product estimator of Kaplan-Meier is valid for any subdivisions of time intervals, for any interval with no events ($d_j=0$), the factor contributed within that interval is identically equal to one $$\left(\text{e.g.,}\; 1 - \frac{0}{n_j} = 1\right).$$

As such, no matter how many subintervals there are with no events, the product of all the one's has no impact on the estimate. Among the listed prior distributions, Haldane's is the only prior distribution guaranteeing that the factor is one for any $n_j$ when $d_j=0$. Furthermore, for any other prior distribution the expected value (E) within a time interval when $d_j=0$ will be less than one. As subdividing the time is arbitrary when no events happen, and can be as finely divided as desired, the limit includes an infinite product of values all less than 1, resulting in a convergence to zero, causing the survivor curve to converge to zero immediately. When the expected value is one and $d_j=0$, then the limit converges to a finite value (e.g., converges to a value of one), allowing for the use of the Haldane's prior distribution.

In examples disclosed herein, the expected value of using Haldane's prior distribution matches exactly the Kaplan-Meier estimate. For example, with $\alpha=\beta=0$ and $X_j \sim \text{Beta}(n_j-d_j, d_j)$, the expected value for $X_j$ can be expressed in accordance with Equation 28. Additionally, the expected value of the product equals the product of the expected values, and the estimate equals the Kaplain-Meier point estimate, as shown in connection with Equations 29-31:

$$E[X_j] = \frac{n_j - d_j}{n_j} = 1 - \frac{d_j}{n_j} \quad \text{Equation 28}$$

$$Y = \prod_{j:t_j \leq t} X_j \quad \text{Equation 29}$$

$$E[Y] = E\left[\prod_{j:t_j \leq t} X_j\right] \quad \text{Equation 30}$$

$$= \prod_{j:t_j \leq t} E[X_j] \quad \text{Equation 31}$$

$$= \prod_{j:t_j \leq t} \left(1 - \frac{d_j}{n_j}\right) = S(t) \quad \text{Equation 32}$$

The true distribution of Y involves the Meijer G function but can be very well approximated by another beta distribution, as described in more detail below. As shown in examples disclosed herein, an estimate of the variance can be obtained in addition to a very good approximate distribution of S(t) itself.

In some examples, the attrition indicator circuitry 114 determines the distribution of the product of independent beta variables. For example, supposing that $X_1, \ldots, X_k$ are independent variables and $X_i$ has a beta $\beta(a_i, b_i)$ distribution, the approximate distribution of $Z = \prod_{i=1}^k X_i$ can be identified in accordance with Equations 33-34, where the system of Equations 35-36 can be used to represent variables S and T, and the resulting beta variables (c and d) can be determined based on Equations 37-38, such that the distribution of Z can be approximated based on a $\beta(c, d)$ distribution:

$$S = E(Z) = \prod_{i=1}^k E(X_i) = \prod_{i=1}^k \frac{a_i}{a_i + b_i} \quad \text{Equation 33}$$

$$T = E(Z^2) = \prod_{i=1}^k E(X_i^2) = \prod_{i=1}^k \frac{a_i(a_i + 1)}{(a_i + b_i)(a_i + b_i + 1)} \quad \text{Equation 34}$$

$$\frac{c}{c + d} = S \quad \text{Equation 35}$$

$$\frac{c(c + 1)}{(c + d)(c + d + 1)} = T \quad \text{Equation 36}$$

$$c = \frac{(S - T)S}{T - S^2} \quad \text{Equation 37}$$

$$d = \frac{(S - T)(1 - S)}{T - S^2} \quad \text{Equation 38}$$

In examples disclosed herein, the attrition indicator circuitry 114 approximates the survival function S(t) as a beta distribution. For example, for $X_j \sim \text{Beta}(n_j-d_j, d_j)$ with $Y = \prod_{k=1}^k X_i$, the quantities S and T can be represented in accordance with Equations 39-43:

$$S = E(Y) = \prod_{j=1}^k E(X_j) = \prod_{j=1}^k \frac{a_j}{a_j + b_j} \quad \text{Equation 39}$$

$$= \prod_{j=1}^k \frac{n_j - d_j}{(n_j - d_j) + d_j} = \prod_{j=1}^k \left(1 - \frac{d_j}{n_j}\right) = \hat{S}(t) \quad \text{Equation 40}$$

-continued $$T = E(Y^2) = \prod_{j=1}^{k} E(X_j^2) = \prod_{j=1}^{k} \frac{a_j(a_j+1)}{(a_j+b_j)(a_j+b_j+1)} \quad \text{Equation 41}$$

$$= \left(\prod_{j=1}^{k} \frac{a_j}{a_j+b_j}\right)\left(\prod_{j=1}^{k} \frac{a_j+1}{a_j+b_j+1}\right) \quad \text{Equation 42}$$

$$= \left(\prod_{j=1}^{k} 1 - \frac{d_j}{n_j}\right)\left(\prod_{j=1}^{k} 1 - \frac{d_j}{n_j+1}\right) = \hat{S}(t)\hat{S}^+(t) \quad \text{Equation 43}$$

In the example of Equations 39-43, $S^+(t)$ can be defined the same as $S(t)$, except the number at risk is increased by one, as shown in connection with Equations 44-45:

$$\hat{S}(t) = \prod_{j=1}^{k} 1 - \frac{d_j}{n_j} \quad \text{Equation 44}$$

$$\hat{S}^+(t) = \prod_{j=1}^{k}\left(1 - \frac{d_j}{n_j+1}\right) \quad \text{Equation 45}$$

The attrition indicator circuitry 114 identifies the variance of Y in accordance with Equations 46-50, as shown below:

$$\widehat{Var}(Y) = E(Y^2) - E(Y)^2 \quad \text{Equation 46}$$

$$= T - S^2 \quad \text{Equation 47}$$

$$= \hat{S}(t)\hat{S}^+(t) - \hat{S}^2(t) \quad \text{Equation 48}$$

$$= \hat{S}(t)(\hat{S}^+(t) - \hat{S}(t)) \quad \text{Equation 49}$$

$$= S(S^+ - S) \quad \text{Equation 50}$$

In the example of Equation 50, time dependences are excluded for readability. As such, a quick estimate of the variance of the survival function can be obtained by calculating both S and $S^+$ and then completing the operation S ($S^+$ - S). The parameters of the new beta distribution (c and d) can also be computed, $Y \sim \beta(c, d)$ in accordance with Equations 51 and 52:

$$c = \frac{(S-T)S}{T - S^2} = \frac{(1-S^+)S}{S^+ - S} \quad \text{Equation 51}$$

$$d = \frac{(S-T)(1-S)}{T - S^2} = \frac{(1-S^+)(1-S)}{S^+ - S} \quad \text{Equation 52}$$

As such, an estimate of the survival curve can be determined for a specific time interval. For example, for j=2 representing the time t∈[7, 10], the estimate of the survival curve is evaluated as shown below, including an estimated variance calculation and the calculation of beta parameters (c, d) for the overall estimated beta distribution approximation:

$$\hat{S}(t) = \left(1 - \frac{3}{21}\right)\left(1 - \frac{1}{17}\right) = \left(\frac{18}{21}\right)\left(\frac{16}{17}\right) = 0.807$$

$$\hat{S}^+(t) = \left(1 - \frac{3}{21+1}\right)\left(1 - \frac{1}{17+1}\right) = \left(\frac{19}{22}\right)\left(\frac{17}{18}\right) = 0.815$$

$$\widehat{Var}(\hat{S}(t)) = S(S^+ - S) = 0.807(0.815 - 0.807) = 0.0072$$

$$c = \frac{(1-S^+)S}{S^+ - S} = 16.6461$$

$$d = \frac{(1-S^+)(1-S)}{S^+ - S} = 3.98812$$

Based on the example estimate of the survival curve, $\hat{S}(t)$ approximately follows a beta distribution along the time interval t ∈ [7, 10] with parameters given above. The estimate of the survival curve can also be expressed as follows: $\hat{S}(t) \sim \beta(16.6461, 3.98812)$ for t ∈ [7, 10]. Additionally, with a known beta distribution, a minimal coverage of a 95% confidence interval can be determined to be [0.640, 0.956]. For example, a plot of the distribution β(16.6461, 3.98812) shows a maximum at 0.840, while the expected value is 0.807, which is the estimate of $\hat{S}(t)$. In some examples, the attrition indicator circuitry 114 determines that the variance of the Kaplan-Meier estimate has already been computed, either using Greenwood's formula or other methods as described above. With the assumption that the distribution is beta distributed, the attrition indicator circuitry 114 applies a method of moments to estimate the two parameters (e.g., a method of estimation of population parameters). For example, the method of moments can be used when variances have already been computed (e.g., using published tables, etc.). For example, given Z~Beta(c, d), the expected value E and variance of E can be determined in accordance with Equations 53 and 54:

$$E(Z) = \frac{c}{c+d} \quad \text{Equation 53}$$

$$Var(Z) = \frac{cd}{(c+d)^2(1+c+d)} \quad \text{Equation 54}$$

Setting these equal to the observed mean and variance (m and v, respectively), the beta parameters (c, d) can be solved for as follows using Equations 55 and 56:

$$c = \frac{m^2 - m^3 - mv}{v} \quad \text{Equation 55}$$

$$d = \frac{(m-1)(m^2 - m + v)}{v} \quad \text{Equation 56}$$

As an example, using the same time unit as above (j=2), but accessing a variance given in a table (e.g., published table of Greenwood's estimator, etc.), where m=0.807 and v=0.0076, the parameters of the beta distribution can be estimated as follows:

$$c = \frac{m^2 - m^3 - mv}{v} = 15.7313$$

$$d = \frac{(m-1)(m^2 - m + v)}{v} = 3.76226$$

In examples disclosed herein, the attrition indicator circuitry 114 can use the resulting beta distribution to determine probabilities and confidence intervals associated with panelist attrition levels, as described in more detail in connection with FIGS. 2-3.

Figure 2:
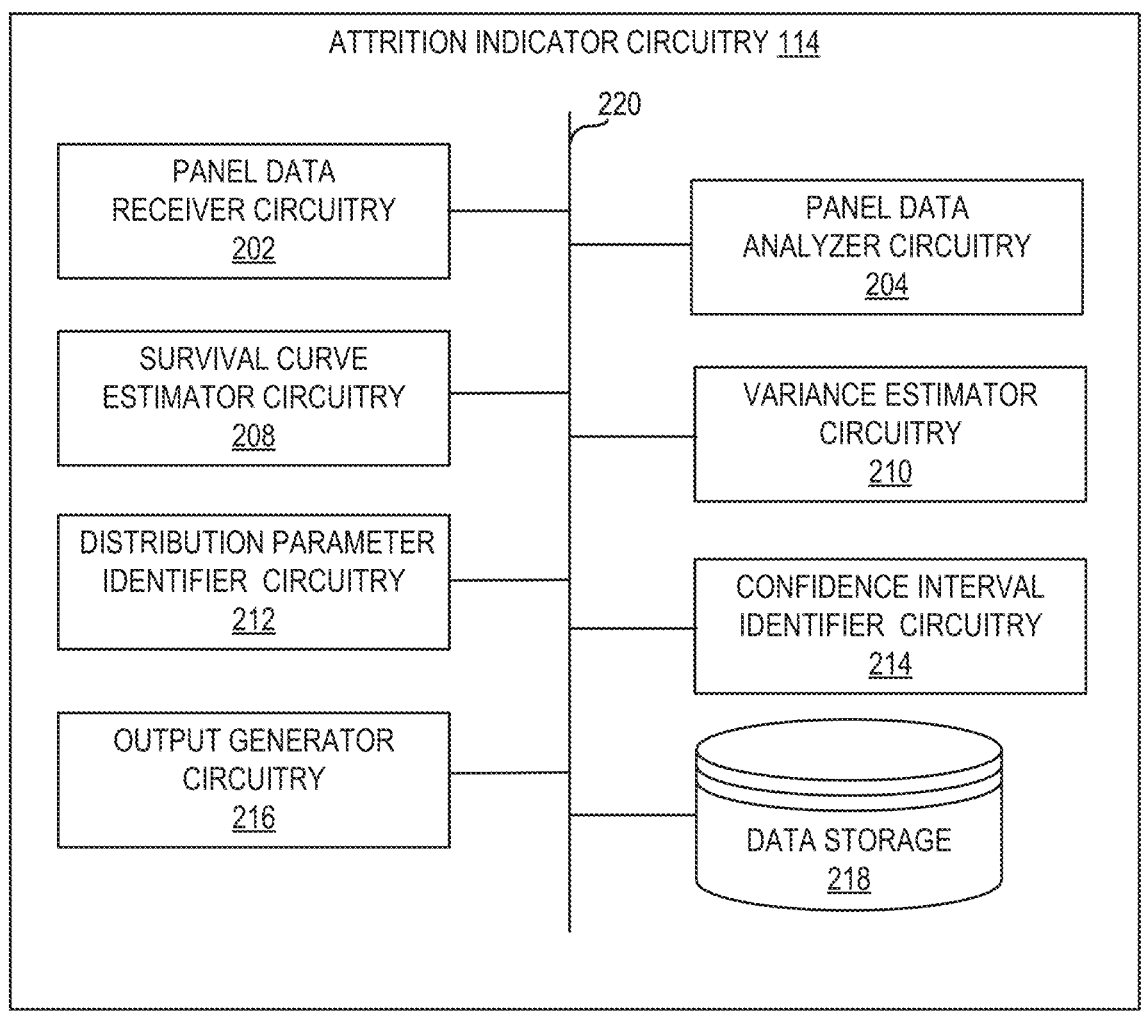
FIG. 2 is a block diagram of an example implementation of the attrition indicator circuitry of FIG. 1.

FIG. 2 is a block diagram 200 of an example implementation of the attrition indicator circuitry 114 of FIG. 1. The attrition indicator circuitry 114 of FIG. 1 may be instantiated (e.g., creating an instance of, bring into being for any length of time, materialize, implement, etc.) by processor circuitry such as a central processing unit executing instructions. Additionally or alternatively, the attrition indicator circuitry 114 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the example of FIG. 2, the attrition indicator circuitry 114 includes panel data receiver circuitry 202, panel data analyzer circuitry 204, survival curve estimator circuitry 208, variance estimator circuitry 210, distribution parameter identifier circuitry 212, confidence interval identifier circuitry 214, output generator circuitry 216, and/or a data storage 218. In some examples, the data storage 218 is external to the attrition indicator circuitry 114 in a location accessible to the attrition indicator circuitry 114.

The panel data receiver circuitry 202 receives data from the audience measurement entity (AME) 112. In some examples, the panel data receiver circuitry 202 receives data relating to user viewership and/or media exposure (e.g., length of time that a panelist viewed a television program, etc.). In some examples, the panel data receiver circuitry 202 receives data from the AME 112 and/or directly from the panel meter 108 of FIG. 1 (e.g., via the network 110) that provides information about panel meter usage (e.g., panel meter 108 usage by the panelist(s) 102). For example, panel meter usage data from the AME 112 can include dates on which the panel meter was installed, the number of panelist(s) that sent activity logs after installation of the panel meter, the number of panelist(s) that installed the panel meter but never sent an activity log, etc. In some examples, the panel data analyzer circuitry 204 determines the exact number of panel meters that are active on specific dates of interest and/or identifies panelist cohorts that are of interest (e.g., based on demographics, etc.).

The panel data analyzer circuitry 204 analyzes panel meter-based data received using the panel data receiver circuitry 202. In some examples, the panel meter data can be in a raw format that requires further processing to determine panelist-based activities related to logging and/or panel meter installation. For example, the panel data analyzer circuitry 204 can be used to group the panelists into categories (e.g., "active panelists" corresponding to panelists who installed a panel meter and sent an activity log, "never active panelists" corresponding to panelists who installed a panel meter but never sent an activity log, "currently active panelists" who continue to submit activity logs, and/or "attriter panelists" corresponding to panelists who were once active but have stopped submitting activity logs, etc.). In some examples, the panel data analyzer circuitry 204 can identify a total number of panelists who are active and/or have become attriters based on gender, age and/or household size. Panel meter-based data can be used as input to determine anticipated attrition rates.

The survival curve estimator circuitry 208 generates a survival curve based on the input panel meter data. In some examples, the survival curve estimator uses a Kaplan-Meier survival curve to represent the probability of a panelist remaining active (e.g., surviving) for a given length of time. In some examples, the survival curve estimator circuitry 208 uses the Kaplan-Meier survival analysis as a method of statistically assessing survival times for observations that include censored subjects (e.g., panelists who have left the panel). In some examples, the survival curve estimator circuitry 208 determines the survival curve using Equations 1, 19-21, and/or 44-45. In some examples, the survival curve estimator circuitry 208 identifies a non-parametric estimate of the survival function that matches the Kaplan-Meier estimate. In some examples, the survival curve estimator circuitry 208 determines a distribution of the product of independent beta variables (e.g., beta variables c and d of Equations 37-38 and/or 51-52). In some examples, the survival curve estimator circuitry 208 approximates the survival function as a beta distribution in accordance with Equations 39-43. In some examples, the survival curve estimator circuitry 208 determines the survival curve S(t) based on whether the input data includes censoring and/or does not include censoring, as described in connection with FIG. 4.

The variance estimator circuitry 210 determines a variance associated with the survival curve S(t). For example, the variance estimator circuitry 210 identifies the variance in accordance with Equations 7-9, 22-24, and/or 46-50. In some examples, the variance estimator circuitry 210 identifies the variance based on whether input data includes censoring (e.g., an event of interest is not observed for some subjects before a cutoff date). In some examples, the variance estimator circuitry 210 determines whether the variance (e.g., variance associated with the Kalan-Meier estimate) has already been computed (e.g., listed in a published table of Greenwood's estimator, etc.). If the variance estimator circuitry 210 determines that the variance data is available, the variance estimator circuitry 210 identifies the available variance value(s) for use in place of estimating the variance.

The distribution parameter identifier circuitry 212 determines beta distribution parameter values. For example, the distribution parameter identifier circuitry 212 determines beta distribution parameters $\beta(c, d)$ using Equations 37-38, 51-52, and/or 55-56. In some examples, the distribution parameter identifier circuitry 212 applies a method of moments to estimate the two beta parameters (e.g., a method of estimation of population parameters), based on the assumption that the distribution is beta distributed. In some examples, the method of moments can be used when variances have already been computed (e.g., using published tables, etc.), as determined using the variance estimator circuitry 210.

The confidence interval identifier circuitry 214 identifies confidence intervals associated with the survival curve S(t). In some examples, the confidence interval identifier circuitry 214 identifies a minimal coverage of a 95% confidence interval. In some examples, the confidence interval identifier circuitry 214 identifies confidence interval(s) to determine percentage of panelists who remain active after panel meter installation versus panelists who become inactive and/or can be classified as attriters (e.g., based on inactivity over a defined period of time). As such, the confidence interval identifier circuitry 214 can use the resulting beta distribution to determine probabilities and/or confidence intervals associated with panelist attrition levels, as described in more detail in connection with FIGS. 3-4.

The output generator circuitry 216 outputs data related to the survival curve determined using the survival curve estimator circuitry 208, the variance estimator circuitry 210, the distribution parameter identifier circuitry 212, and/or the confidence interval identifier circuitry 214. In some examples, the output generator circuitry 216 outputs an attrition curve showing the percentage of panelists remaining over a given time interval, as shown in connection with FIG. 7. In some examples, the output generator circuitry 216 generates data corresponding to the number of panelists who leave the panel and cease to submit activity logs (e.g., attriters) and the number of panelists who remain active after installation of the panel meter (e.g., panel meter 108). In some examples, the output generator circuitry 216 determines expected panel attrition based on the existing panel meter data associated with active and/or inactive panelists. In some examples, the attrition curve output received from the output generator circuitry 216 can be used to determine a number of panelists who become inactive (e.g., cease to submit activity logs) over a given period of time. In some examples, the attrition curve output received from the output generator circuitry 216 can trigger an evaluation of audience member counts to determine the accuracy of existing data related to panelists. In some examples, the attrition curve output can be used to evaluate reasons for panel attrition and/or methods of decreasing panel attrition over time.

The data storage 218 can be used to store any information associated with the panel data receiver circuitry 202, the panel data analyzer circuitry 204, the survival curve estimator circuitry 208, the variance estimator circuitry 210, the distribution parameter identifier circuitry 212, the confidence interval identifier circuitry 214, and/or the output generator 216. The example data store 218 of the illustrated example of FIG. 2 can be implemented by any memory, storage device and/or storage disc for storing data such as flash memory, magnetic media, optical media, etc. Furthermore, the data stored in the example data storage 218 can be in any data format such as binary data, comma delimited data, tab delimited data, structured query language (SQL) structures, image data, etc.

In some examples, the apparatus includes means for receiving panel data. For example, the means for receiving panel data may be implemented by panel data receiver circuitry 202. In some examples, the panel data receiver circuitry 202 may be instantiated by processor circuitry such as the example processor circuitry 1012 of FIG. 10. For instance, the panel data receiver circuitry 202 may be instantiated by the example microprocessor 1100 of FIG. 11 executing machine executable instructions such as those implemented by at least block 305 of FIG. 3. In some examples, the panel data receiver circuitry 202 may be instantiated by hardware logic circuitry, which may be implemented by an ASIC, XPU, or the FPGA circuitry 1200 of FIG. 12 structured to perform operations corresponding to the machine readable instructions. Additionally or alternatively, the panel data receiver circuitry 202 may be instantiated by any other combination of hardware, software, and/or firmware. For example, the panel data receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing panel data. For example, the means for analyzing panel data may be implemented by panel data analyzer circuitry 204. In some examples, the panel data analyzer circuitry 204 may be instantiated by processor circuitry such as the example processor circuitry 1012 of FIG. 10. For instance, the panel data analyzer circuitry 204 may be instantiated by the example microprocessor 1100 of FIG. 11 executing machine executable instructions such as those implemented by at least block 310 of FIG. 3. In some examples, the panel data analyzer circuitry 204 may be instantiated by hardware logic circuitry, which may be implemented by an ASIC, XPU, or the FPGA circuitry 1200 of FIG. 12 structured to perform operations corresponding to the machine readable instructions. Additionally or alternatively, the panel data analyzer circuitry 204 may be instantiated by any other combination of hardware, software, and/or firmware. For example, the panel data analyzer circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for estimating a survival curve. For example, the means for estimating a survival curve may be implemented by survival curve estimator circuitry 208. In some examples, the survival curve estimator circuitry 208 may be instantiated by processor circuitry such as the example processor circuitry 1012 of FIG. 10. For instance, the survival curve estimator circuitry 208 may be instantiated by the example microprocessor 1100 of FIG. 11 executing machine executable instructions such as those implemented by at least block 315 of FIG. 3. In some examples, the survival curve estimator circuitry 208 may be instantiated by hardware logic circuitry, which may be implemented by an ASIC, XPU, or the FPGA circuitry 1200 of FIG. 12 structured to perform operations corresponding to the machine readable instructions. Additionally or alternatively, the survival curve estimator circuitry 208 may be instantiated by any other combination of hardware, software, and/or firmware. For example, the survival curve estimator circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for estimating a variance. For example, the means for estimating a variance may be implemented by variance estimator circuitry 210. In some examples, the variance estimator circuitry 210 may be instantiated by processor circuitry such as the example processor circuitry 1012 of FIG. 10. For instance, the variance estimator circuitry 210 may be instantiated by the example microprocessor 1100 of FIG. 11 executing machine executable instructions such as those implemented by at least block 330 of FIG. 3. In some examples, the variance estimator circuitry 210 may be instantiated by hardware logic circuitry, which may be implemented by an ASIC, XPU, or the FPGA circuitry 1200 of FIG. 12 structured to perform operations corresponding to the machine readable instructions. Additionally or alternatively, the variance estimator circuitry 210 may be instantiated by any other combination of hardware, software, and/or firmware. For example, the variance estimator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a distribution parameter. For example, the means for identifying a distribution parameter may be implemented by distribution parameter identifier circuitry 212. In some examples, the distribution parameter identifier circuitry 212 may be instantiated by processor circuitry such as the example processor circuitry 1012 of FIG. 10. For instance, the distribution parameter identifier circuitry 212 may be instantiated by the example microprocessor 1100 of FIG. 11 executing machine executable instructions such as those implemented by at least blocks 325, 335 of FIG. 3. In some examples, the distribution parameter identifier circuitry 212 may be instantiated by hardware logic circuitry, which may be implemented by an ASIC, XPU, or the FPGA circuitry 1200 of FIG. 12 structured to perform operations corresponding to the machine readable instructions. Additionally or alternatively, the distribution parameter identifier circuitry 212 may be instantiated by any other combination of hardware, software, and/or firmware. For example, the distribution parameter identifier circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a confidence interval. For example, the means for identifying a confidence interval may be implemented by confidence interval identifier circuitry 214. In some examples, the confidence interval identifier circuitry 214 may be instantiated by processor circuitry such as the example processor circuitry 1012 of FIG. 10. For instance, the confidence interval identifier circuitry 214 may be instantiated by the example microprocessor 1100 of FIG. 11 executing machine executable instructions such as those implemented by at least block 340 of FIG. 3. In some examples, the confidence interval identifier circuitry 214 may be instantiated by hardware logic circuitry, which may be implemented by an ASIC, XPU, or the FPGA circuitry 1200 of FIG. 12 structured to perform operations corresponding to the machine readable instructions. Additionally or alternatively, the confidence interval identifier circuitry 214 may be instantiated by any other combination of hardware, software, and/or firmware. For example, the confidence interval identifier circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for outputting panel attrition data. For example, the means for outputting panel attrition data may be implemented by the output generator circuitry 216. In some examples, the output generator circuitry 216 may be instantiated by processor circuitry such as the example processor circuitry 1012 of FIG. 10. For instance, the output generator circuitry 216 may be instantiated by the example microprocessor 1100 of FIG. 11 executing machine executable instructions such as those implemented by at least block 345 of FIG. 3. In some examples, the output generator circuitry 216 may be instantiated by hardware logic circuitry, which may be implemented by an ASIC, XPU, or the FPGA circuitry 1200 of FIG. 12 structured to perform operations corresponding to the machine readable instructions. Additionally or alternatively, the output generator circuitry 216 may be instantiated by any other combination of hardware, software, and/or firmware. For example, the output generator circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the attrition indicator circuitry 114 of FIGS. 1 and/or 2 is illustrated in FIG. 2, one or more of the elements, processes, and/or devices illustrated in FIG. 2 may be combined, divided, re-arranged, omitted, eliminated, and/or implemented in any other way. Further, the panel data receiver circuitry 202, the panel data analyzer circuitry 204, the survival curve estimator circuitry 208, the variance estimator circuitry 210, the distribution parameter identifier circuitry 212, the confidence interval identifier circuitry 214, the output generator circuitry 216, and/or, more generally, the example attrition indicator circuitry 114 of FIG. 1, may be implemented by hardware, software, firmware, and/or any combination of hardware, software, and/or firmware. Thus, for example, any of panel data receiver circuitry 202, the panel data analyzer circuitry 204, the survival curve estimator circuitry 208, the variance estimator circuitry 210, the distribution parameter identifier circuitry 212, the confidence interval identifier circuitry 214, the output generator circuitry 216, and/or, more generally, the example attrition indicator circuitry 114 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example attrition indicator circuitry 114 may include one or more elements, processes, and/or devices in addition to, or instead of, those illustrated in FIG. 2, and/or may include more than one of any or all of the illustrated elements, processes and devices.

Figure 3:
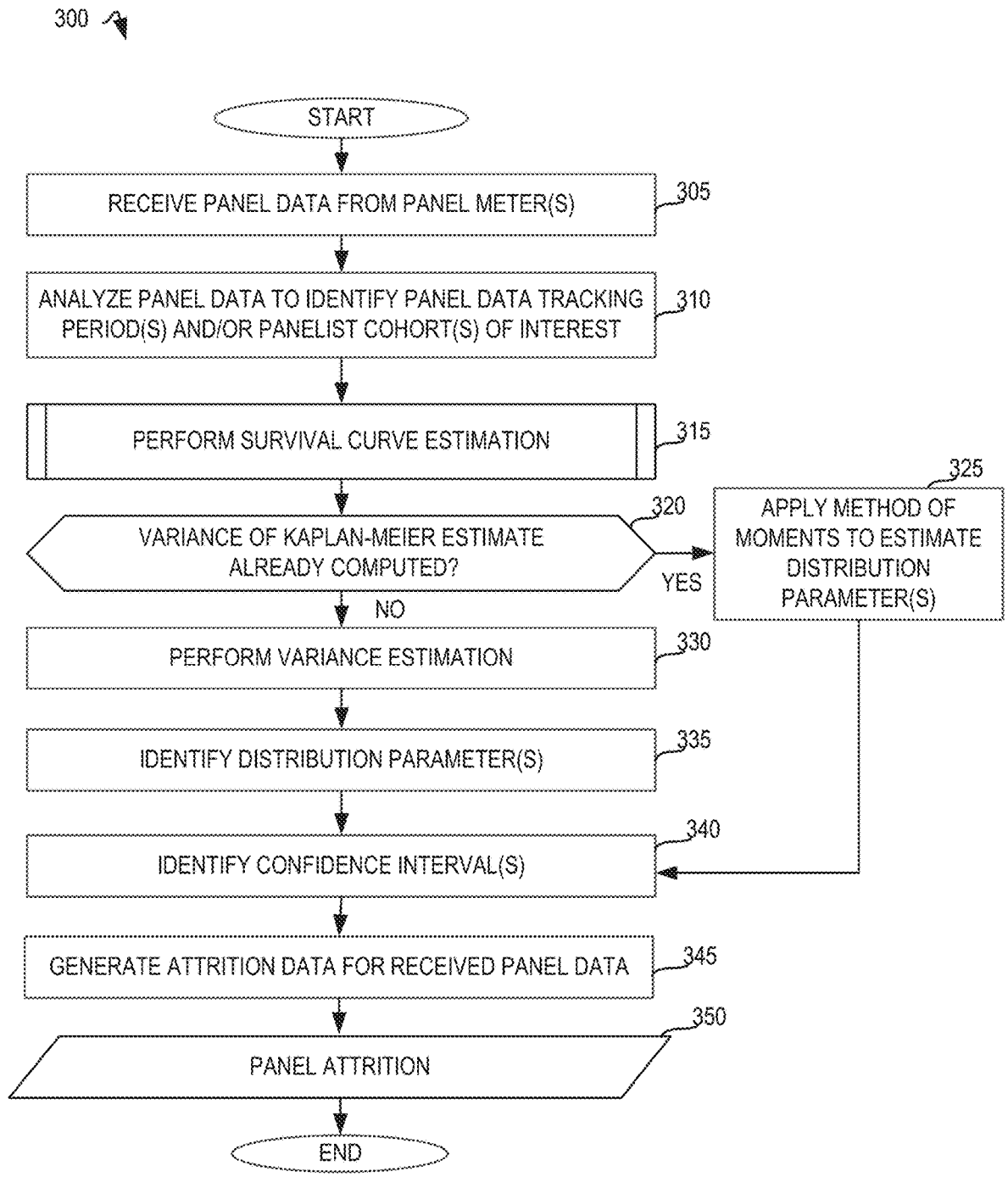
FIG. 3 is a flowchart representative of example machine readable instructions and/or example operations that may be executed by example processor circuitry to implement the attrition indicator circuitry of FIG. 1.
Figure 4:
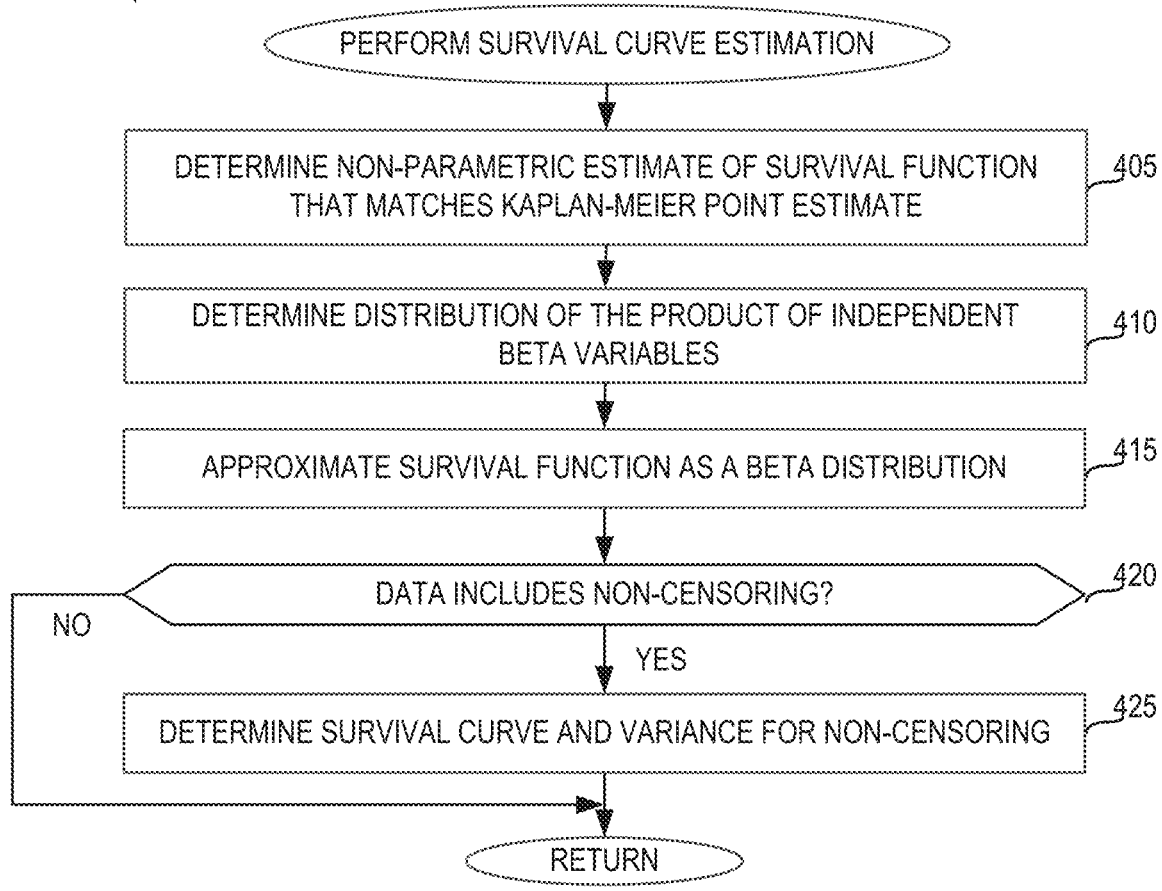
FIG. 4 is a flowchart representative of example machine readable instructions and/or example operations that may be executed by example processor circuitry to perform survival curve estimation using the attrition indicator circuitry of FIG. 1.

Flowcharts representative of example hardware logic circuitry, machine readable instructions, hardware implemented state machines, and/or any combination thereof for implementing the attrition indicator circuitry 114 are shown in FIGS. 3-4. The machine readable instructions may be one or more executable programs or portion(s) of an executable program for execution by processor circuitry, such as the processor circuitry 1012 shown in the example processor platform 1000 discussed below in connection with FIG. 10, and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) are described with reference to the flowcharts illustrated in FIGS. 3 and/or 4, many other methods of implementing the example attrition indicator circuitry 114 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or operations 300 that may be executed and/or instantiated by processor circuitry to implement the example attrition indicator circuitry 114 of FIG. 2. The machine readable instructions and/or the operations 300 of FIG. 3 begin at block 305 at which the panel data receiver circuitry 202 receives panel data from the panel meter(s) (e.g., panel meter 108 of FIG. 1). For example, the panel data receiver circuitry 202 receives information corresponding to panel meter activation and/or deactivation. In some examples, the panel data receiver circuitry 202 receives panel meter usage data directly from the audience measurement entity (AME) 112. In some examples, panel meter usage data can include dates on which the panel meter was installed, the number of panelist(s) that sent activity logs after installation of the panel meter, the number of panelist(s) that installed the panel meter but never sent an activity log, etc. In some examples, the panel data analyzer circuitry 204 determines the number of panel meters that are active on specific dates of interest and/or identifies panelist cohorts that are of interest (e.g., based on demographics, etc.) (block 310). Once the panel data has been assessed using the panel data analyzer circuitry 204, the survival curve estimator circuitry 208 performs survival curve estimation (block 315), as described in more detail in connection with FIG. 4. For example, the survival curve can be used to approximate the number of panelists that will become attriters (e.g., cease to submit activity logs) at a given time over the course of a tracking period. Once the survival curve is determined, the variance estimator circuitry 210 determines whether a variance (e.g., of a Kaplan-Meier estimate) has already been computed (e.g., available in tabulated form based on a Greenwood's estimator, etc.) (block 320). If variance is already computed, the distribution parameter identifier circuitry 212 determines beta distribution parameters using a method of moments (block 325). If the variance estimator circuitry 210 determines that variance has not been computed and needs to be determined, the variance estimator circuitry 210 performs variance estimation (block 330). For example, the variance estimator circuitry 210 identifies variance based on whether input data includes censoring (e.g., panel attrition is not observed for some panelists who never leave the panel and/or never become inactive before a given cutoff date used for statistical analysis). For example, the variance estimator circuitry 210 determines variance associated with the survival curve S(t) to identify how spread out the panel meter-based data is, such as whether the variance is small (e.g., all measurements are close to the mean) or whether the variance is large (e.g., data is spread out and highly variable). Therefore, statistical assessment of the existing panel meter data can be used to determine panel meter attrition levels and anticipate expected attrition levels, as shown in connection with FIG. 7.

For example, the distribution parameter identifier circuitry 212 determines beta distribution parameter values, where the beta distribution represents probability as a random variable (block 335). In examples disclosed herein, the distribution parameter identifier circuitry 212 identifies beta distribution parameters using a method of moments (e.g., a method of estimation of population parameters), based on the assumption that the distribution is beta distributed. Separately, the confidence interval identifier circuitry 214 identifies confidence intervals associated with the survival curve S(t) (block 340). In some examples, the confidence interval identifier circuitry 214 identifies a 95% confidence interval. For example, the output generator circuitry 216 uses the determined confidence interval(s) to identify a percentage of panelists who remain active after panel meter installation versus panelists who become inactive and/or can be classified as attriters (e.g., based on inactivity over a defined period of time). In some examples, the output generator circuitry 216 generates panel attrition data for the received panel data (e.g., associated with panel meter(s) such as panel meter 108 of FIG. 1) (block 345). For example, the panel attrition data can be grouped based on gender, age, and/or household size. In the example of FIG. 3, the output generator circuitry 216 outputs the panel attrition data in numerical and/or graphical form, as shown in connection with FIGS. 7 and/or 9.

FIG. 4 is a flowchart representative of example machine readable instructions and/or operations 315 that may be executed and/or instantiated by processor circuitry to perform survival curve estimation using the survival curve estimator circuitry 208 of FIG. 2. The machine readable instructions and/or the operations 315 of FIG. 4 begin at block 405 at which the survival curve estimator circuitry 208 determines a non-parametric estimate of the survival function matching the Kaplan-Meier point estimate. For example, the Kaplan-Meier point estimate represents the most common non-parametric technique for modeling the survival function as part of survival analysis (e.g., non-negative regression and density estimation for a single random variable in the presence of censoring). For example, survival time corresponds to the time from a starting point (e.g., time at which panel meter 108 is installed) to an endpoint of interest (e.g., time at which panelist ceases to submit activity logs and/or uninstalls the panel meter 108). Using the survival function provides information on the probability of a time-to-event of interest (e.g., panelist attrition) by modeling the probability of a panelist surviving (e.g., being active) beyond a specified time. The survival curve estimator circuitry 208 further determines the distribution of the product of independent beta variables (block 410) and approximates the survival function S(t) as a beta distribution (block 415). In some examples, the survival curve estimator circuitry 208 determines whether the data includes non-censoring (e.g., exact time points at which panelist attrition occurs are known) in addition to censored data (e.g., data for which exact time points at which panelist attrition occurs are unknown because some panelists never become inactive) (block 420). If the data includes uncensored data, the survival curve estimator circuitry 208 determines the survival curve and/or variance for uncensored data (block 425), as described in connection with FIG. 2.

Figure 5:
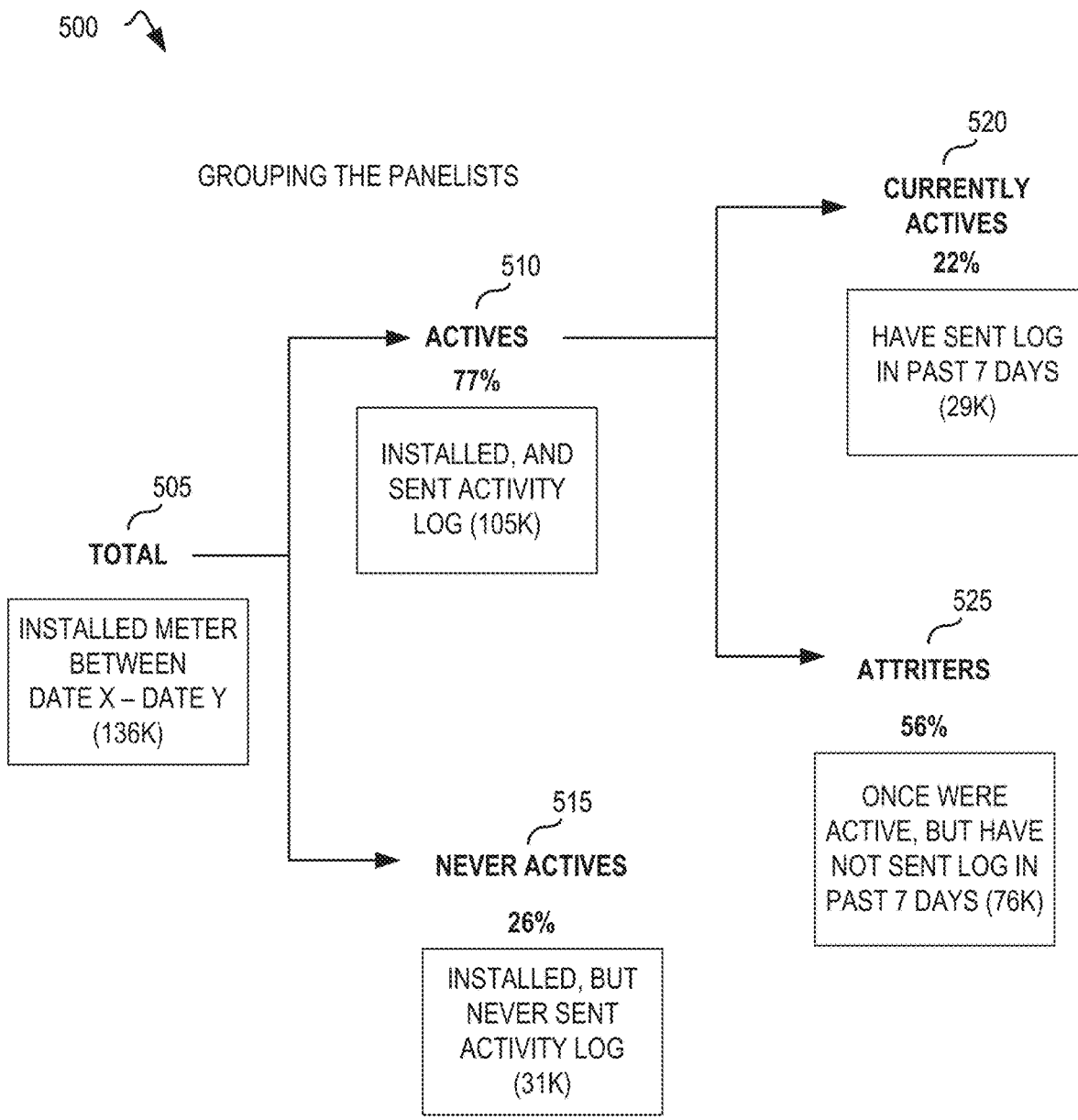
FIG. 5 illustrates an example grouping of panelists based on panel attrition data generated using the attrition indicator circuitry of FIG. 1.

FIG. 5 illustrates an example grouping of panelists 500 based on panel attrition data generated using the attrition indicator circuitry 114 of FIG. 1. In the example of FIG. 5, the panelists are grouped based on panel meter status (e.g., installed, uninstalled) and/or activity log submission. For example, the panel data analyzer circuitry 204 determines a total number of panelists 505 that installed a panel meter (e.g., panel meter 108 of FIG. 1) over a specified time interval of interest (e.g., 136,000 panelists installed a panel meter between date x and date y). In some examples, the panel data analyzer circuitry 204 subdivides the total number of panelists 505 into two additional groups (e.g., a total number of active panelists 510 and a total number of panelists who never became active 515). In the example of FIG. 5, the total number of active panelists 510 corresponds to panelists who installed the panel meter and submitted an activity log (e.g., 105,000 panelists or 77% of the total number of panelists 505). In the example of FIG. 5, the total number of panelists who never became active 515 corresponds to panelists who installed the panel meter but never submitted an activity log (e.g., 31,000 panelists or 26% of the total number of panelists 505). In some examples, the panel data analyzer circuitry 204 subdivides the total number of active panelists 510 into two additional groups (e.g., a total number of currently active panelists 520 and a total number of attriters 525). In the example of FIG. 5, the total number of currently active panelists 520 corresponds to panelists who have sent an activity log in the past week at the time of analysis (e.g., 29,000 panelists or 22% of the total number of active panelists 510). In the example of FIG. 5, the total number of attriters 525 corresponds to panelists who once were active but have not submitted an activity log in the past week at the time of analysis (e.g., 76,000 panelists or 56% of the total number of active panelists 510).

Figure 6:
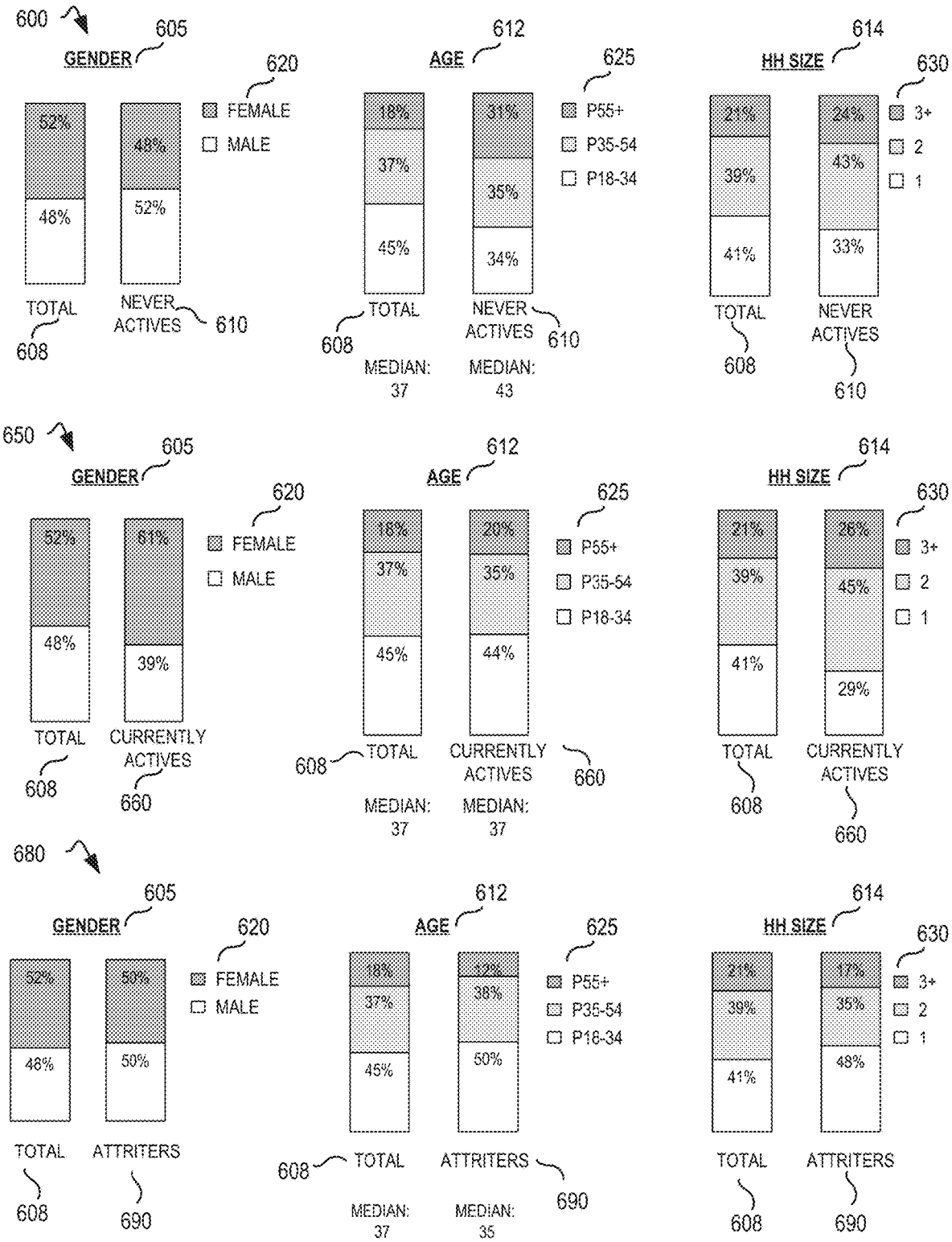
FIG. 6 includes example profiles illustrating representations of panelists becoming inactive after panel meter installation, panelists remaining active after a given period of time, and panelists who become attriters based on gender, age, and/or household size.

FIG. 6 includes example profiles 600, 650, 680 illustrating representations of panelists becoming inactive after panel meter installation, panelists remaining active after a given period of time, and panelists who become attriters based on gender, age, and/or household size. In some examples, the panel data analyzer circuitry 204 generates the separate demographic-based profiles based on data available from the grouping performed in connection with FIG. 5. For example, the panel data analyzer circuitry 204 identifies the profile 600 for the total number of panelists who never became active 515 of FIG. 5. The profile 600 includes a summary of a total number of panelists 608 and a total number of never active panelists 610 based on an example gender grouping 605 (e.g., a male/female category 620), an example age grouping 612 (e.g., age range 625 of 18-34, 35-54, and 55+), and an example household size grouping 614 (e.g., household size of 1, 2, and 3+). The profile 650 includes a summary of a total number of panelists 608 and a total number of currently active panelists 660 based on the gender grouping 605, the age grouping 612, and the household size grouping 614. The profile 680 includes a summary of a total number of panelists 608 and a total number of attriters 690 based on the gender grouping 605, the age grouping 612, and the household size grouping 614. In the example of FIG. 6, the total number of never active panelists 610 tend to be male, older, and come from larger households, the total number of currently active panelists 660 tend to be female and come from larger households, and the total number of attriters 690 tend to be younger and come from single-person households.

Figure 7:
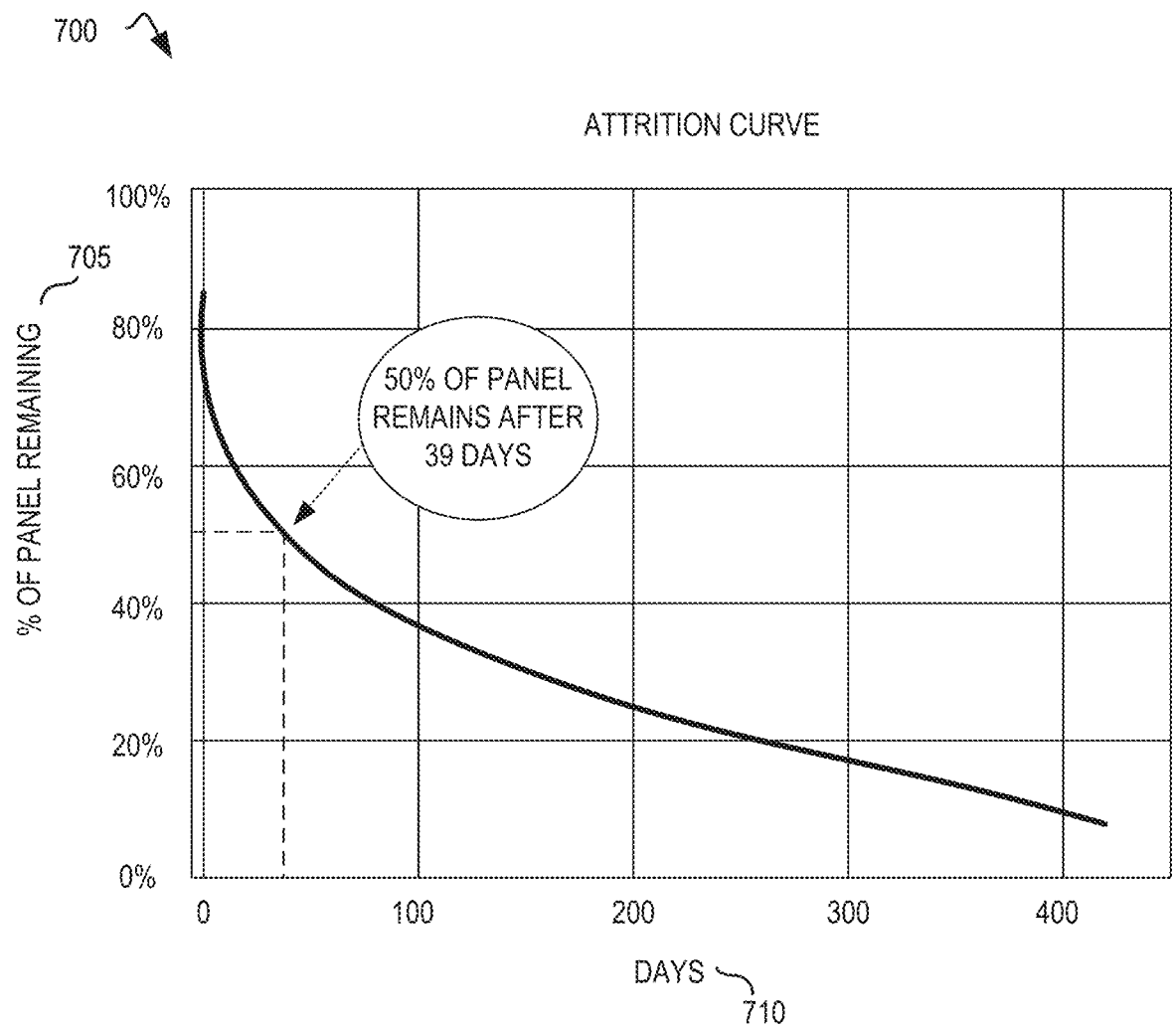
FIG. 7 provides a graphical representation of a percentage of panelists remaining over a given period of time and/or anticipated panel attrition over time, as determined using the attrition indicator circuitry of FIG. 1.

FIG. 7 provides a graphical representation 700 of a percentage of panelists remaining over a given period of time and/or anticipated panel attrition over time, as determined using the attrition indicator circuitry 114 of FIG. 1. In the example of FIG. 7, the graphical representation 700 includes a percentage of the panel remaining 705 after a given number of days 710. For example, the output generator circuitry 216 outputs the graphical representation 700 and/or generates data related to the expected attrition rates over a given time period of interest. For example, 50% of the panel will remain after a total of 39 days based on the attrition curve of the graphical representation 700, with the attrition curve used to determine what percent of the panel is expected to remain active after a certain number of days.

Figure 8:
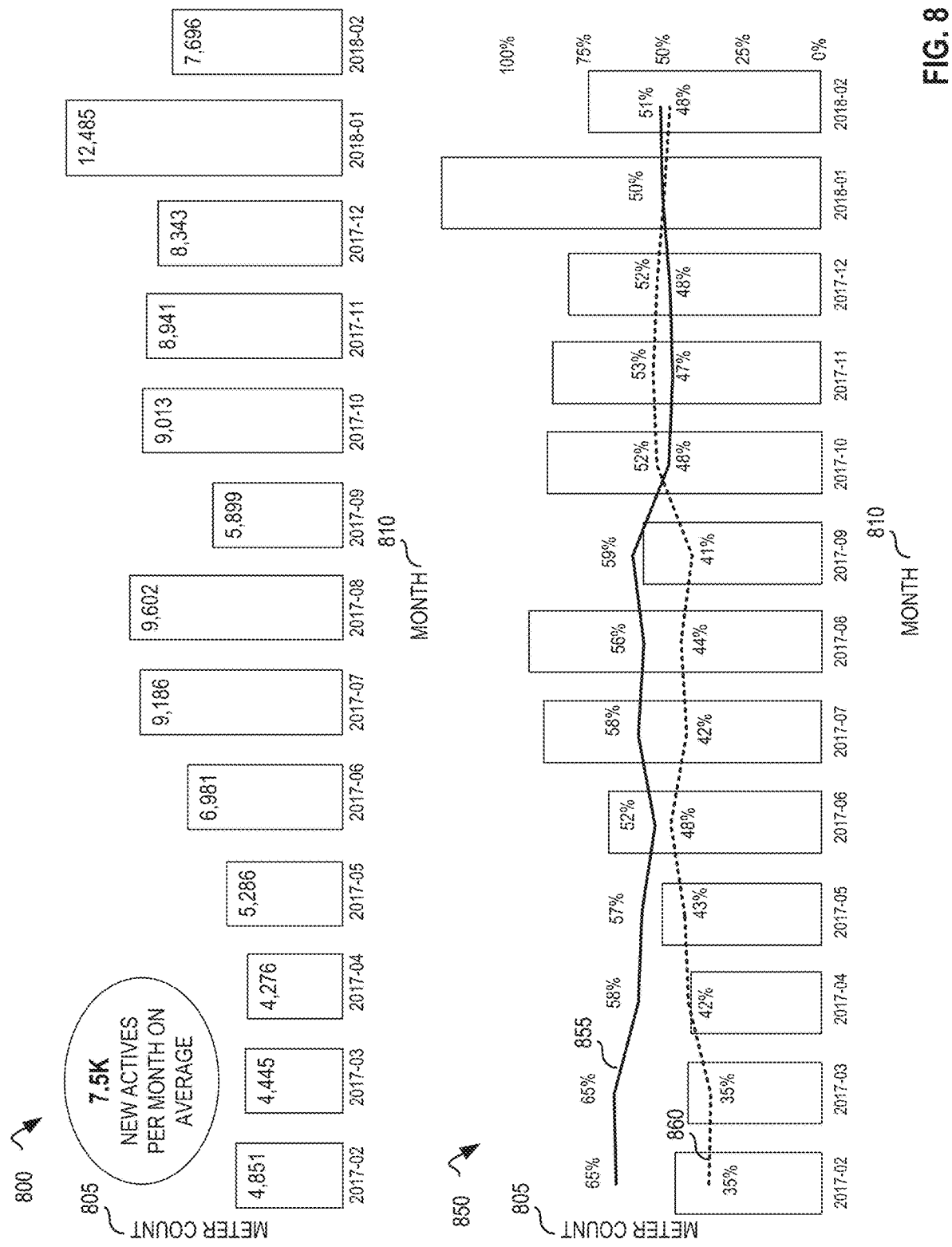
FIG. 8 includes plots illustrating graphical representations of a panelist cohort analysis including percentages of the cohort that represents active panelists and inactive panelists.

FIG. 8 includes plots illustrating graphical representations 800, 850 of a panelist cohort analysis including percentages of the cohort that represent active panelists and inactive panelists (e.g., attriters). In the example of the graphical representation 800, a cohort total count is shown based on a meter count 805 over the course of a given month 810. In the example of the graphical representation 850, a percentage of panelists who remain active (e.g., for more than 30 days) 855 is shown in comparison with a percentage of panelists who become attriters (e.g., remain active for less than 30 days) 860 over the course of the given month 810. Based on the generated data, on average 46% of panelists become attriters while 54% of panelists remain active. In examples disclosed herein, the graphical representations 800, 850 can be generated using the output generator circuitry 216 to provide an analysis of the panelist cohort over a specific time period of interest. In some examples, the attrition indicator circuitry 114 uses data from existing panelist cohort analyses to determine the attrition curve of FIG. 7 to provide anticipated panel attrition levels at a future point in time based on the available data.

Figure 9:
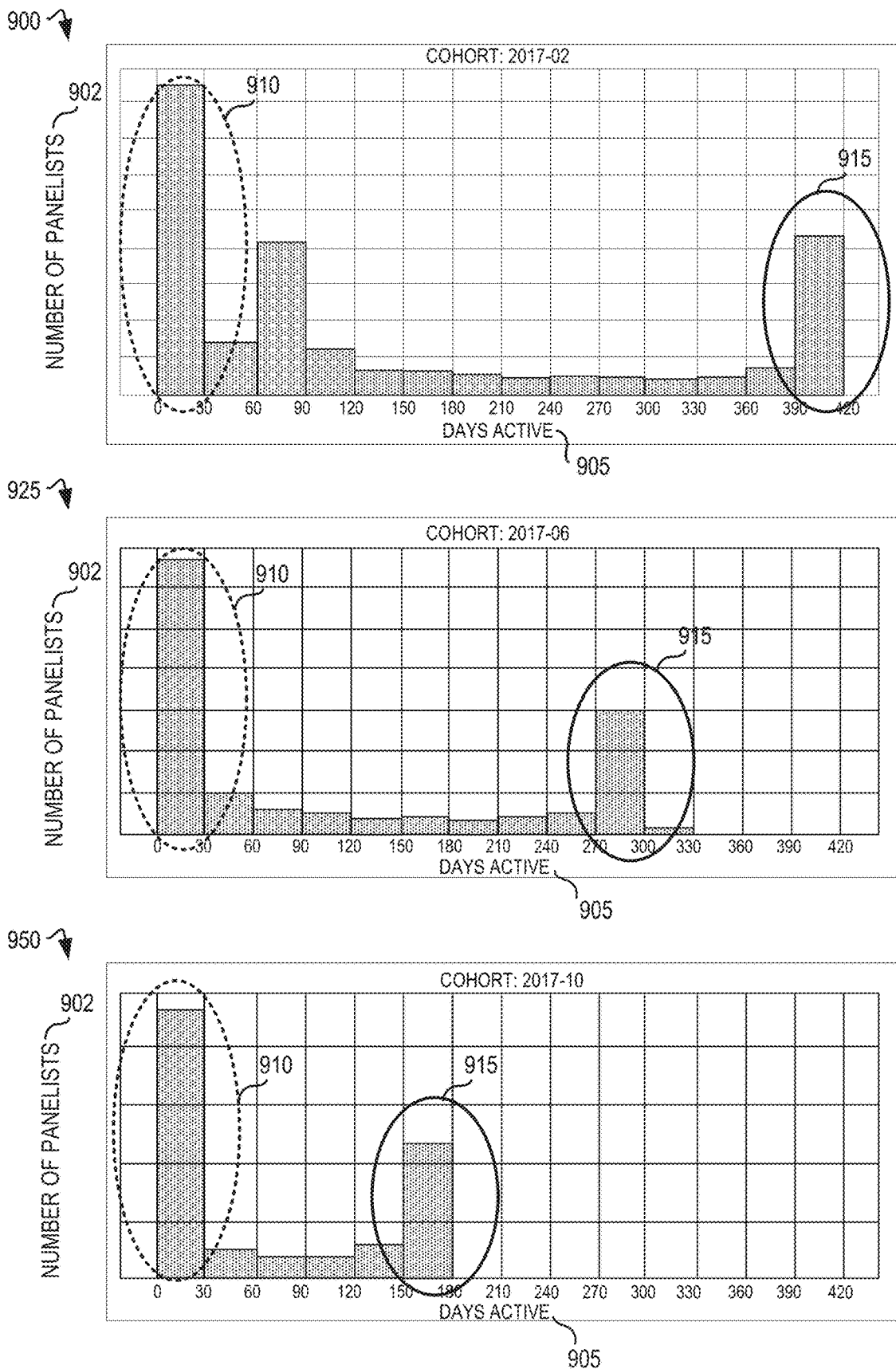
FIG. 9 includes plots illustrating graphical representations of panelists representing members of the panel that remain active versus members of the panel that become inactive.

FIG. 9 includes plots illustrating graphical representations 900, 925, 950 of panelists representing members of the panel that remain active versus members of the panel that become inactive (e.g., attriters). For example, a number of panelists 902 that are active over a specified number of days 905 can be used to determine the total number of panelists who become inactive in a short period of time 910 (e.g., panel attrition within 30 days) versus the number of panelists who remain active for a longer period of time 915 (e.g., panelists active for over a year) using a specific cohort of interest (e.g., based on demographics, period of activity, etc.). In some examples, the panel data analyzer circuitry 204 performs panel data attrition analysis based on existing data to use as part of the determination of anticipated attrition levels using the attrition indicator circuitry 114 of FIG. 1. In some examples, the output generator circuitry 216 provides an assessment of anticipated panelist attrition rates based on the existing panelist attrition data generated using the attrition indicator circuitry 114.

Figure 10:
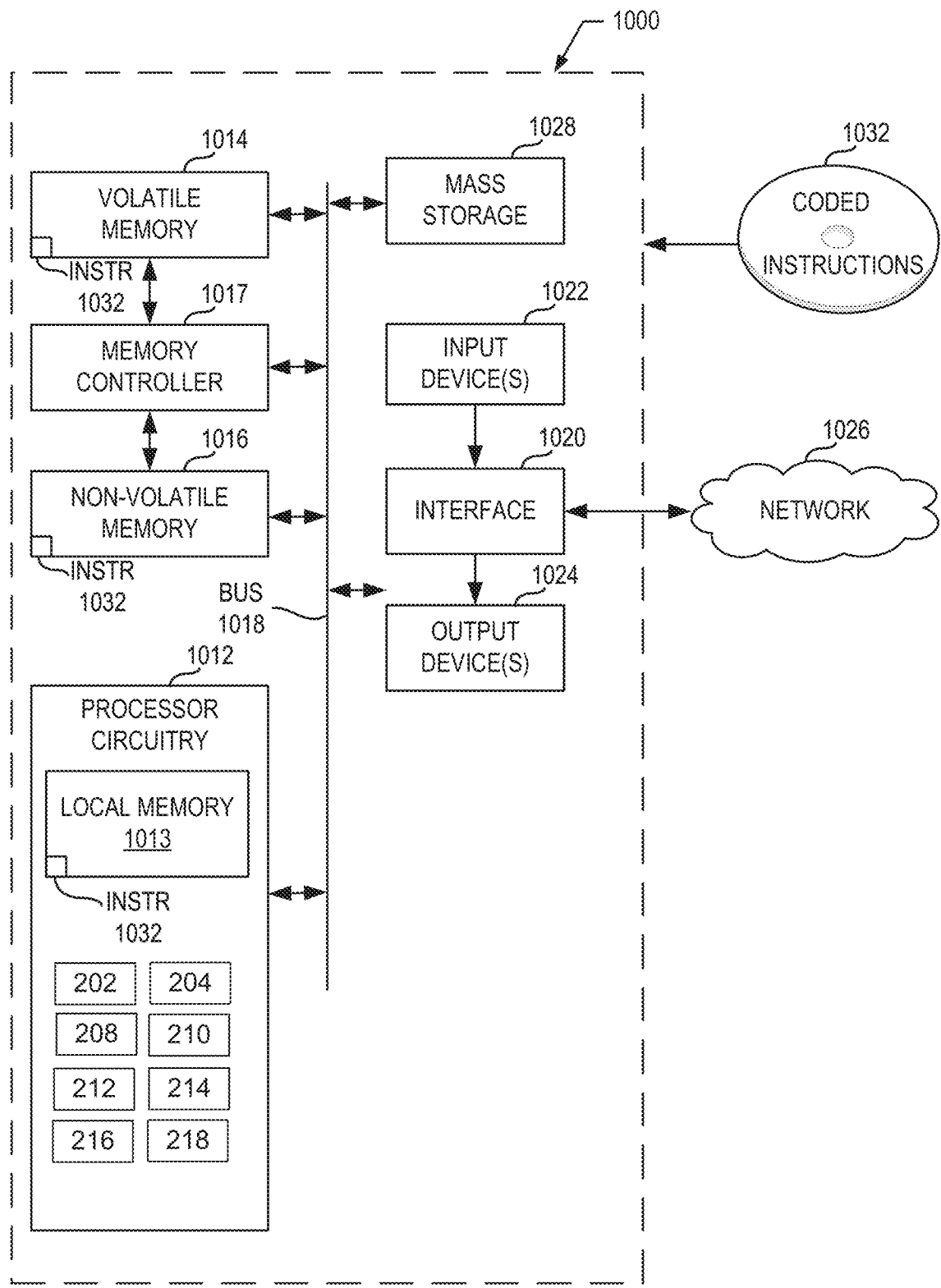
FIG. 10 is a block diagram of an example processing platform including processor circuitry structured to execute the example machine readable instructions and/or the example operations of FIGS. 3 and/or 4 to implement the example attrition indicator circuitry of FIG. 1.

FIG. 10 is a block diagram of an example processor platform 1000 structured to execute and/or instantiate the machine readable instructions and/or operations of FIGS. 3 and/or 4 to implement the attrition indicator circuitry 114 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs micropro- cessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the panel data receiver circuitry 202, panel data analyzer circuitry 204, survival curve estimator circuitry 208, variance estimator circuitry 210, distribution parameter identifier circuitry 212, confidence interval identifier circuitry 214, output generator circuitry 216, and/or data storage 218.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 3-4, may be stored in the mass storage device 1028, in the volatile memory 1014, in the non-volatile memory 1016, and/or on a removable non-transitory computer readable storage medium such as a CD or DVD.

Figure 11:
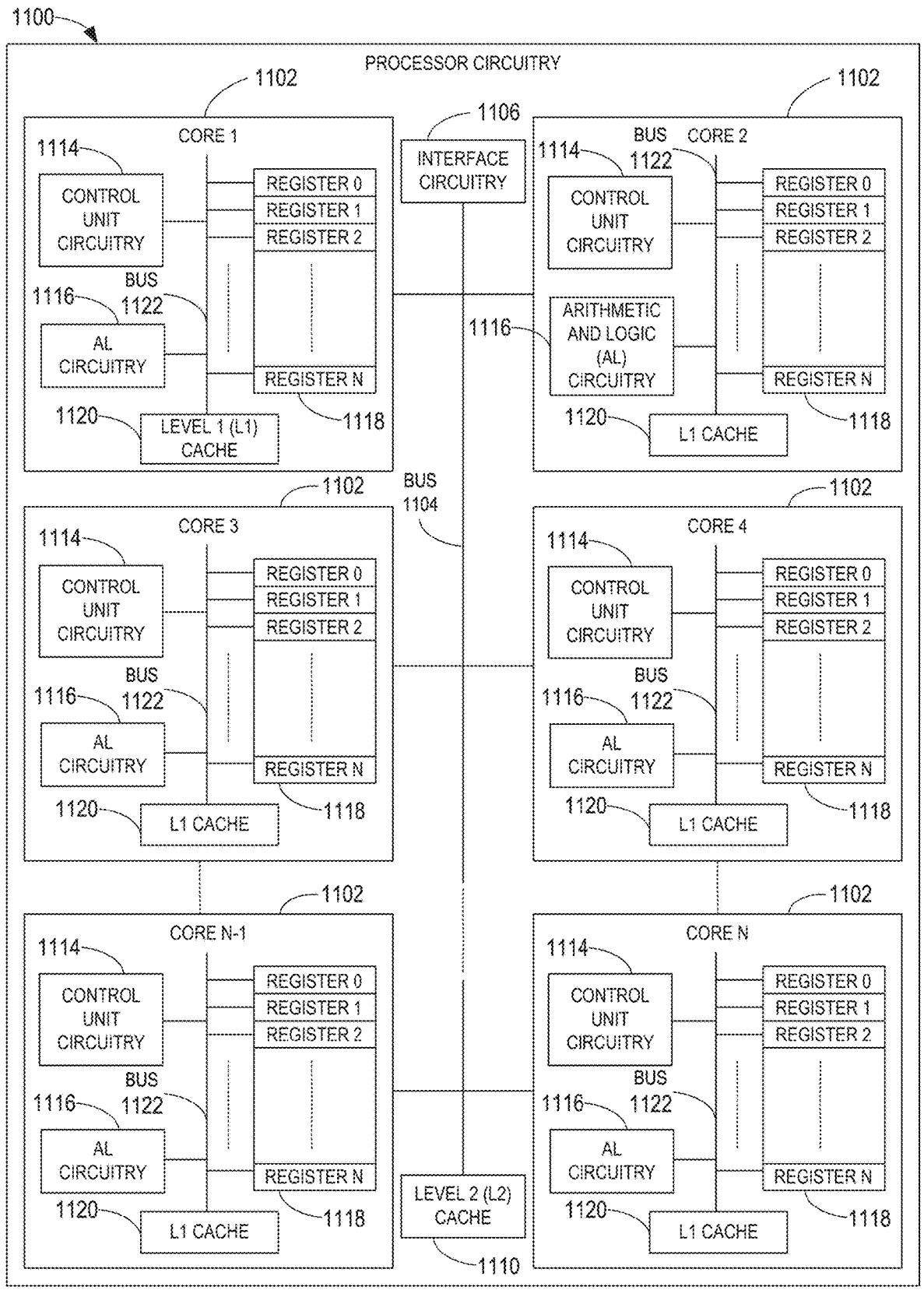
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowchart of FIGS. 3 and/or 4 to effectively instantiate the circuitry of FIGS. 1 and/or 2 as logic circuits to perform the operations corresponding to those machine readable instructions. In some such examples, the circuitry of FIGS. 1 and/or 2 is instantiated by the hardware circuits of the microprocessor 1100 in combination with the instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 3 and/or 4.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2~cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
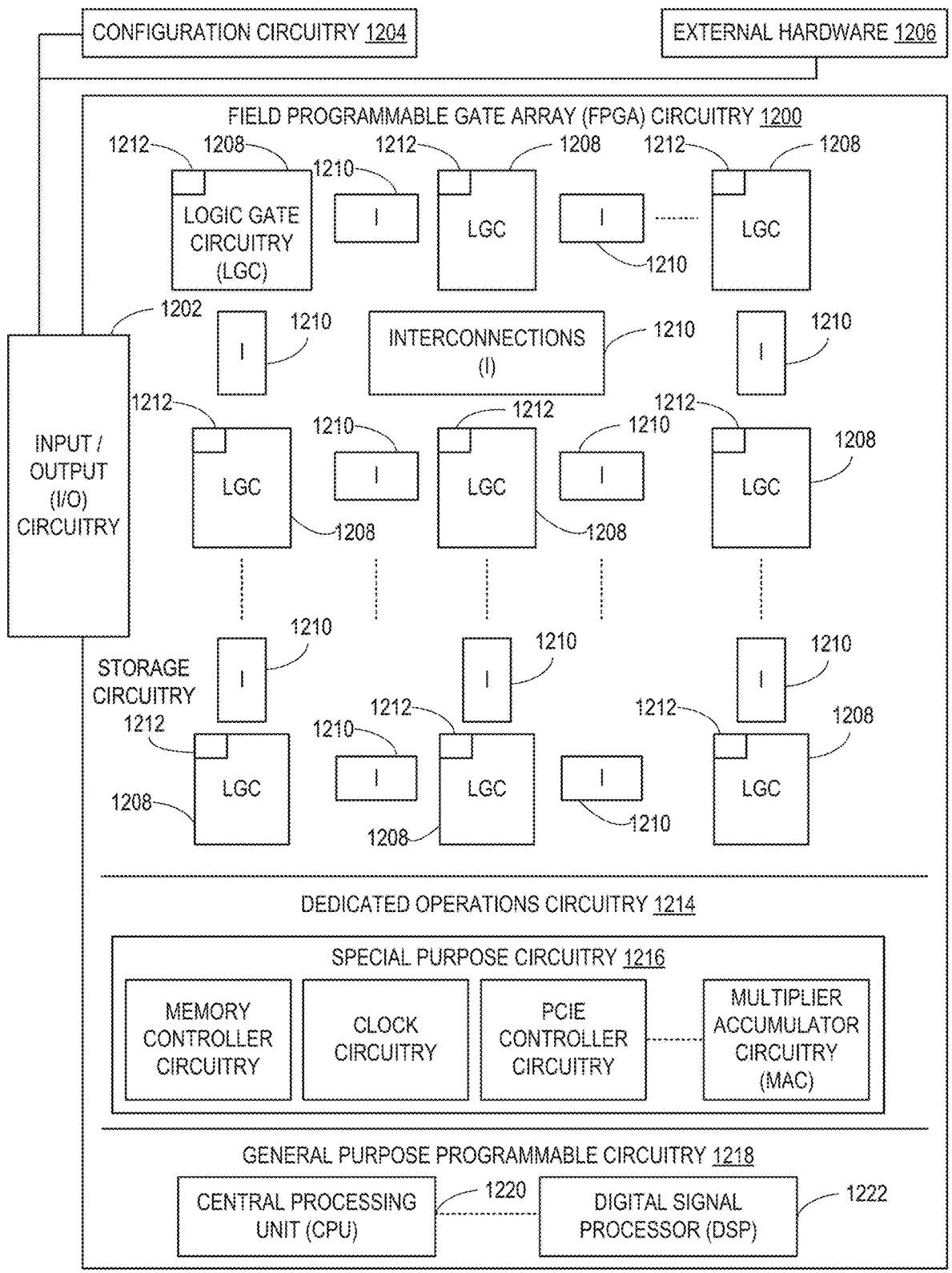
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 3 and/or 4 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 3 and/or 4. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 3 and/or 4. As such, the FPGA circuitry 1200 may be structured to effectively instantiate some or all of the machine readable instructions of the flowcharts of FIGS. 3 and/or 4 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 3 and/or 4 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1200 of FIG. 12. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 3 and/or 4 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an onboard CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 3 and/or 4 may be executed by one or more of the cores 1102 of FIG. 11, a second portion of the machine readable instructions represented by the flowcharts of FIGS. 3 and/or 4 may be executed by the FPGA circuitry 1200 of FIG. 12, and/or a third portion of the machine readable instructions represented by the flowcharts of FIGS. 3 and/or 4 may be executed by an ASIC. It should be understood that some or all of the circuitry of FIG. 10 may, thus, be instantiated at the same or different times. Some or all of the circuitry may be instantiated, for example, in one or more threads executing concurrently and/or in series. Moreover, in some examples, some or all of the circuitry of FIG. 10 may be implemented within one or more virtual machines and/or containers executing on the microprocessor.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10 which may be in one or more packages. For example, the XPU may include a CPU in one package, a DSP in another package, a GPU in yet another package, and an FPGA in still yet another package.

Figure 13:
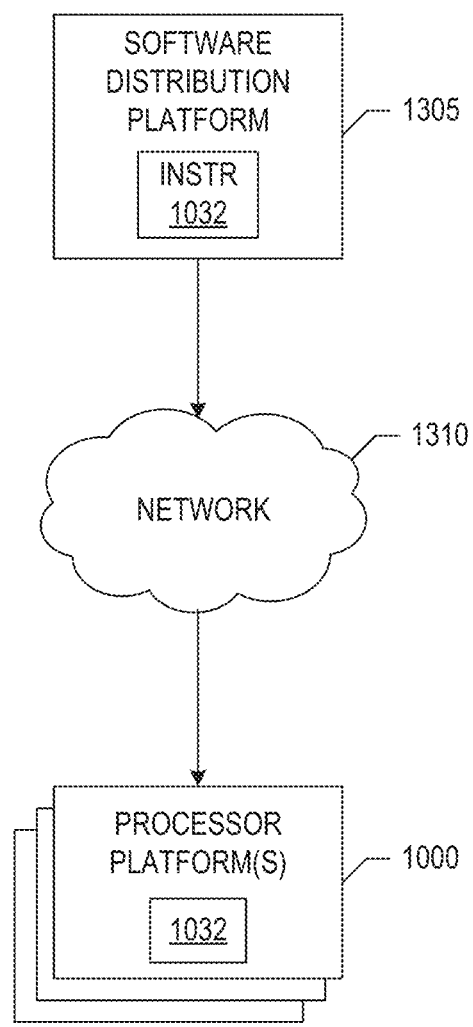
FIG. 13 is a block diagram of an example software distribution platform (e.g., one or more servers) to distribute software (e.g., software corresponding to the example machine readable instructions of FIGS. 3 and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032 of FIG. 10, which may correspond to the example machine readable instructions 300 and/or 315 of FIGS. 3 and/or 4, as described above. The one or more servers of the example software distribution platform 1305 are in communication with a network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 300 and/or 315 of FIGS. 3 and/or 4 may be downloaded to the example processor platform 1000 which is to execute the machine readable instructions 1032 to implement the attrition indicator circuitry 114. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that permit determination of panel attrition based on an approximate distribution of a non-parametric estimate of a survival function. For example, a Haldane's prior distribution can be used within a beta distribution, wherein a Kaplan-Meier product estimate (e.g., a non-parametric estimate of a survival curve that can include censoring) is treated as a product of independent beta distributions. In examples disclosed herein, a non-parametric estimate of the survival function can be used to identify panelists who remain active after panel meter installation versus panelists who become inactive and/or can be classified as attriters. Furthermore, examples disclosed herein permit estimation of anticipated panel attrition levels. Such panelist attrition assessment contributes to improved analyses associated with panel data collection.

Example methods, apparatus, systems, and articles of manufacture to determine panel attrition are disclosed herein. Further examples and combinations thereof include the following:

Example 1 includes an apparatus to estimate panel attrition, the apparatus comprising at least one memory, machine readable instructions, and processor circuitry to execute the machine readable instructions to determine a beta distribution of a non-parametric survival curve estimate based on panel meter data associated with a cohort of panelists, determine confidence intervals for a set of beta distribution parameters associated with the survival curve estimate, and output a panelist attrition estimate generated based on the confidence intervals for the survival curve estimate, the panelist attrition estimate to represent panelist retention over time based on an installation date of the panel meter.

Example 2 includes the apparatus of example 1, wherein the panel meter data includes at least one of a panel meter install date, a panel meter uninstall date, or activity log submission data.

Example 3 includes the apparatus of example 1, wherein the processor circuitry is to apply a method of moments to estimate the beta distribution parameters when a variance of the survival curve estimate is known.

Example 4 includes the apparatus of example 1, wherein the non-parametric survival curve estimate matches a Kaplan-Meier point estimate.

Example 5 includes the apparatus of example 1, wherein the processor circuitry is to determine the non-parametric survival curve estimate for censored and non-censored panel meter data.

Example 6 includes the apparatus of example 1, wherein the panelist attrition estimate includes expected attrition rates for panelists based on a demographic, the demographic including at least one of an age, a gender, or a household size.

Example 7 includes the apparatus of example 1, wherein the processor circuitry is to determine the non-parametric survival curve estimate based on a Haldane's prior distribution within the beta distribution.

Example 8 includes a method to estimate panel attrition, the method comprising determining a beta distribution of a non-parametric survival curve estimate based on the panel meter data associated with a cohort of panelists, determining confidence intervals for a set of beta distribution parameters associated with the survival curve estimate, and outputting a panelist attrition estimate generated based on the confidence intervals for the survival curve estimate, the panelist attrition estimate to represent panelist retention over time based on an installation date of the panel meter.

Example 9 includes the method of example 8, wherein the panel meter data includes at least one of a panel meter install date, a panel meter uninstall date, or activity log submission data.

Example 10 includes the method of example 8, further including applying a method of moments to estimate the beta distribution parameters when a variance of the survival curve estimate is known.

Example 11 includes the method of example 8, wherein the non-parametric survival curve estimate matches a Kaplan-Meier point estimate.

Example 12 includes the method of example 8, further including determining the non-parametric survival curve estimate for censored and non-censored panel meter data.

Example 13 includes the method of example 8, wherein the panelist attrition estimate includes expected attrition rates for panelists based on a demographic, the demographic including at least one of an age, a gender, or a household size.

Example 14 includes the method of example 8, further including determining the non-parametric survival curve estimate based on a Haldane's prior distribution within the beta distribution.

Example 15 includes a non-transitory computer readable storage medium comprising instructions that, when executed, cause a processor to at least determine a beta distribution of a non-parametric survival curve estimate based on panel meter data associated with a cohort of panelists, determine confidence intervals for a set of beta distribution parameters associated with the survival curve estimate, and output a panelist attrition estimate generated based on the confidence intervals for the survival curve estimate, the panelist attrition estimate to represent panelist retention over time based on an installation date of the panel meter.

Example 16 includes the non-transitory computer readable storage medium of example 15, wherein the instructions, when executed, cause the processor to apply a method of moments to estimate the beta distribution parameters when a variance of the survival curve estimate is known.

Example 17 includes the non-transitory computer readable medium of example 15, wherein the non-parametric survival curve estimate matches a Kaplan-Meier point estimate.

Example 18 includes the non-transitory computer readable medium of example 15, wherein the instructions, when executed, cause the processor to determine the non-parametric survival curve estimate for censored and non-censored panel meter data.

Example 19 includes the non-transitory computer readable medium of example 15, wherein the panelist attrition estimate includes expected attrition rates for panelists based on a demographic, the demographic including at least one of an age, a gender, or a household size.

Example 20 includes the non-transitory computer readable medium of example 15, wherein the instructions, when executed, cause the processor to determine the non-parametric survival curve estimate based on a Haldane's prior distribution within the beta distribution.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement computing system for estimating panelist attrition, the audience measurement computing system comprising:
   a processor;
   at least one memory; memory having stored therein machine readable instructions that, when executed by the processor, cause the audience measurement computing system to perform operations comprising:
      determining a beta distribution of a non-parametric survival curve estimate based on panel meter data associated with a cohort of panelists;
      determining confidence intervals for a set of beta distribution parameters associated with the non-parametric survival curve estimate; and
      outputting a panelist attrition estimate generated based on the confidence intervals, the panelist attrition estimate representing panelist retention over time based on an installation date associated with the panel meter data.

2. The audience measurement computing system of claim 1, wherein the panel meter data includes at least one of a panel meter install date, a panel meter uninstall date, or activity log submission data.

3. The audience measurement computing system of claim 1, wherein the operations further include applying a method of moments to estimate the set of beta distribution parameters when a variance of the non-parametric survival curve estimate is known.

4. The audience measurement computing system of claim 1, wherein the non-parametric survival curve estimate matches a Kaplan-Meier point estimate.

5. The audience measurement computing system of claim 1, wherein the operations further include determining the non-parametric survival curve estimate for censored and non-censored panel meter data.

6. The audience measurement computing system of claim 1, wherein the panelist attrition estimate includes expected attrition rates for panelists based on a demographic attribute including at least one of an age, a gender, or a household size.

7. The audience measurement computing system of claim 1, wherein the operations further include determining the non-parametric survival curve estimate based on a Haldane's prior distribution within the beta distribution.

8. A method for estimating panelist attrition, the method comprising:
   determining a beta distribution of a non-parametric survival curve estimate based on panel meter data associated with a cohort of panelists;
   determining confidence intervals for a set of beta distribution parameters associated with the non-parametric survival curve estimate; and
   outputting a panelist attrition estimate generated based on the confidence, the panelist attrition estimate representing panelist retention over time based on an installation date associated with the panel meter data.

9. The method of claim 8, wherein the panel meter data includes at least one of a panel meter install date, a panel meter uninstall date, or activity log submission data.

10. The method of claim 8, further including applying a method of moments to estimate the beta distribution parameters when a variance of the non-parametric survival curve estimate is known.

11. The method of claim 8, wherein the non-parametric survival curve estimate matches a Kaplan-Meier point estimate.

12. The method of claim 8, further including determining the non-parametric survival curve estimate for censored and non-censored panel meter data.

13. The method of claim 8, wherein the panelist attrition estimate includes expected attrition rates for panelists based on a demographic attribute including at least one of an age, a gender, or a household size.

14. The method of claim 8, further including determining the non-parametric survival curve estimate based on a Haldane's prior distribution within the beta distribution.

15. A non-transitory computer readable storage medium having stored thereon instructions that, when executed by a processor of a computing system, cause the computing system to be configured to at least:
   determine a beta distribution of a non-parametric survival curve estimate based on panel meter data associated with a cohort of panelists;
   determine confidence intervals for a set of beta distribution parameters associated with the non-parametric survival curve estimate; and
   output a panelist attrition estimate generated based on the confidence intervals, the panelist attrition estimate representing panelist retention over time based on an installation date associated with the panel meter data.

16. The non-transitory computer readable storage medium of claim 15, wherein the instructions, when executed by the processor, cause the computing system to be configured to apply a method of moments to estimate the beta distribution parameters when a variance of the non-parametric survival curve estimate is known.

17. The non-transitory computer readable medium of claim 15, wherein the non-parametric survival curve estimate matches a Kaplan-Meier point estimate.

18. The non-transitory computer readable medium of claim 15, wherein the instructions, when executed by the processor, cause the computing system to be configured to determine the non-parametric survival curve estimate for censored and non-censored panel meter data.

19. The non-transitory computer readable medium of claim 15, wherein the panelist attrition estimate includes expected attrition rates for panelists based on a demographic attribute including at least one of an age, a gender, or a household size.

20. The non-transitory computer readable medium of claim 15, wherein the instructions, when executed by the processor, cause the computing system to be configured to determine the non-parametric survival curve estimate based on a Haldane's prior distribution within the beta distribution.

* * * * *